United States Patent

Hacker et al.

[11] Patent Number: 5,984,281
[45] Date of Patent: Nov. 16, 1999

[54] CARBURETOR NEEDLE VALVE AND LIMITER CAP INSTALLATION AND ADJUSTMENT APPARATUS

[75] Inventors: David D. Hacker, Cass City; Eric L. King, Deford; George M. Pattullo, Caro, all of Mich.

[73] Assignee: Walbro Corporation, Cass City, Mich.

[21] Appl. No.: 08/986,735

[22] Filed: Dec. 8, 1997

Related U.S. Application Data

[63] Continuation-in-part of application No. 08/696,693, Aug. 14, 1996, Pat. No. 5,753,148
[60] Provisional application No. 60/002,931, Aug. 30, 1995.

[51] Int. Cl.⁶ .................................................. F02M 3/08
[52] U.S. Cl. .................... 261/71; 137/382; 261/DIG. 38; 261/DIG. 84
[58] Field of Search .................... 261/41.1–41.5, 261/71, DIG. 38, DIG. 84; 137/382, 384, 385

[56] References Cited

U.S. PATENT DOCUMENTS

| | | | |
|---|---|---|---|
| 2,618,473 | 11/1952 | Whitford | 261/41.5 |
| 3,321,195 | 5/1967 | Korte | 261/DIG. 84 |
| 3,618,906 | 11/1971 | Charron | 261/71 X |
| 4,097,561 | 6/1978 | Seki et al. | 261/DIG. 38 |
| 4,120,918 | 10/1978 | Codling | 261/71 X |
| 4,242,290 | 12/1980 | Hendelsman et al. | 261/71 X |
| 4,246,929 | 1/1981 | Wakeman | 137/382 |
| 4,271,095 | 6/1981 | Maeda | 261/71 X |
| 4,283,353 | 8/1981 | Miller | 261/DIG. 38 |
| 4,333,891 | 6/1982 | Miller | 261/DIG. 38 |
| 5,055,238 | 10/1991 | Araki | 261/DIG. 38 |
| 5,236,634 | 8/1993 | Hammett | 261/71 |
| 5,252,261 | 10/1993 | Gerhardy | 261/DIG. 84 |
| 5,322,645 | 6/1994 | Hammett et al. | 261/71 |
| 5,525,267 | 6/1996 | Araki | 261/71 |
| 5,603,869 | 2/1997 | McNew et al. | 137/382 X |
| 5,630,965 | 5/1997 | Shaw et al. | 261/DIG. 84 |
| 5,695,693 | 12/1997 | Koizumi et al. | 261/DIG. 38 |
| 5,753,148 | 5/1998 | King et al. | 261/71 |
| 5,772,927 | 6/1998 | Koizumi et al. | 261/DIG. 84 |

FOREIGN PATENT DOCUMENTS

| | | | |
|---|---|---|---|
| 2548226 | 5/1976 | Germany | 261/DIG. 84 |
| 55-104556 | 8/1980 | Japan . | |
| 142650 | 10/1980 | Japan . | |

*Primary Examiner*—Richard L. Chiesa
*Attorney, Agent, or Firm*—Reising, Ethington, Barnes, Kisselle, Learman & McCulloch, P.C.

[57] ABSTRACT

Improvement in peanut clip limiter cap holder, wherein the clip spring legs are interconnected by a spring web that flexes to accommodate flexing of the clip legs free ends during insertion of the associated limiter caps into the retaining clip, and prolongs the effective friction grip service life of the clip. Optional detent dimples on the clip spring legs and cooperative limiter cap grooves enhance yieldable retention of the caps in the clip and the clip on the needle valves. When the peanut clip is used to install only a single limiter cap on a single needle valve, a dummy stud is mounted to the carburetor in the vacant needle valve position and the stud head occupies the vacant limiter cap position in the clip. An improved needle valve is made as an assembly of a lathe-turned tip/shank part and a separate precision die cast head part. The head part has the needle spring stop flange, the fluted spline portion, the limiter cap barb retention structure, and a cavity telescopically receiving a shank stem to rotationally drive couple the shank and head parts in assembly. The shank stem is press fit or cast into the head cavity to permanently join the shank and head parts in fixed relationship, or preferably the head cavity cooperates with the shank stem and a cross arm thereof to form a releasable, telescopic, quarter-turn bayonet coupling. The needle valve spring biases the bayonet coupling to fully locked condition. Coupling axial lost motion insures lock-on of cap retention barbs on the head of the "shorter" needle, and thus final installation lock-on of both limiter caps while being held by the clip. "Side-play" between head and shank parts isolates the needle shank part from adverse needle bending moments.

45 Claims, 10 Drawing Sheets

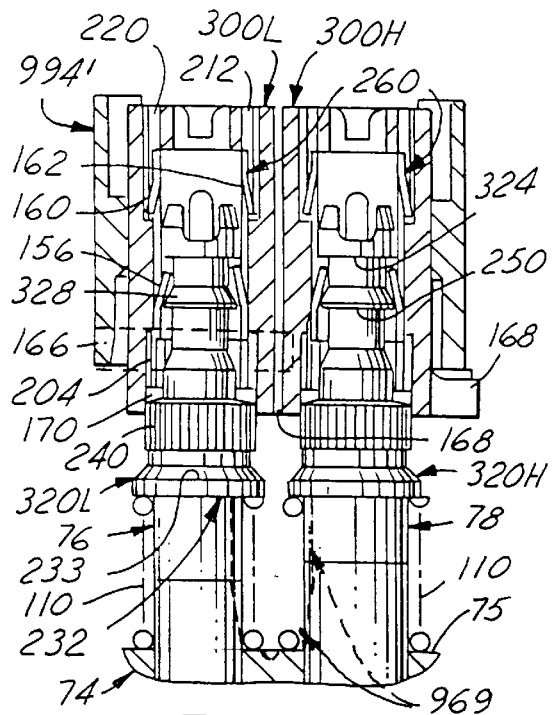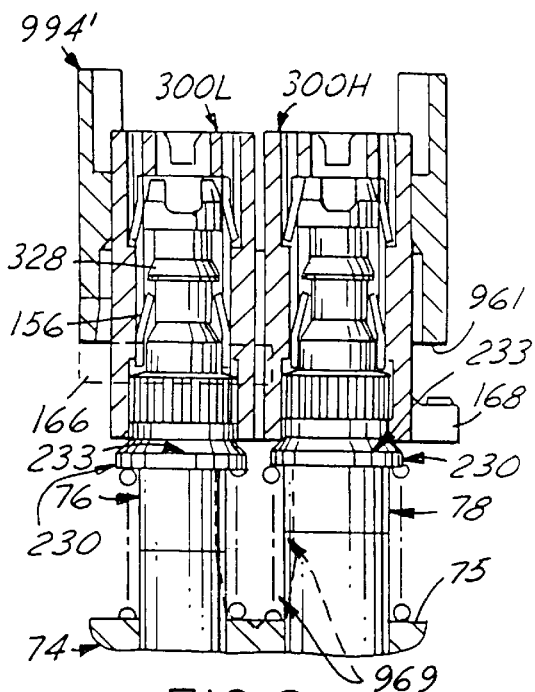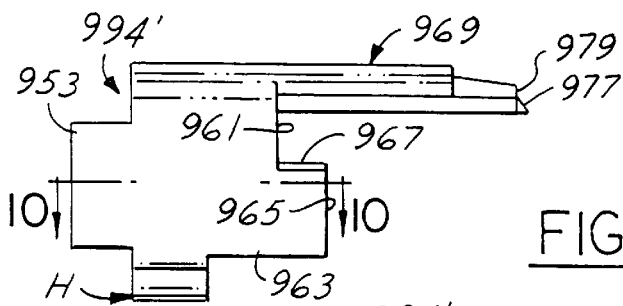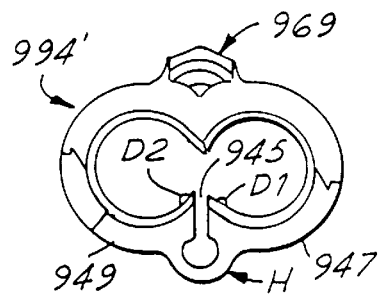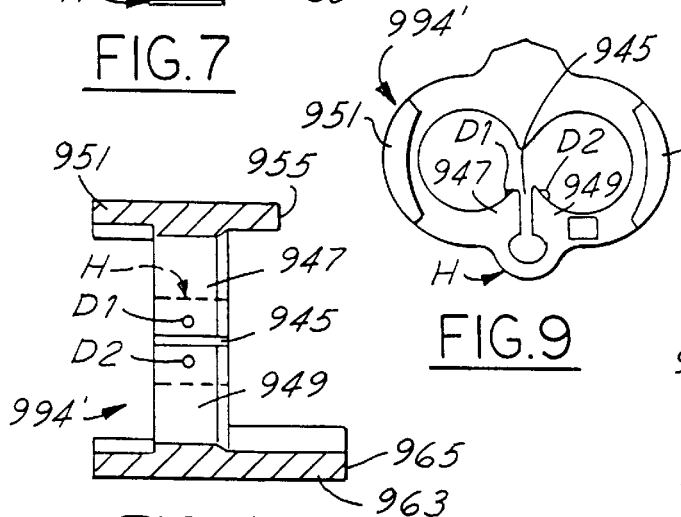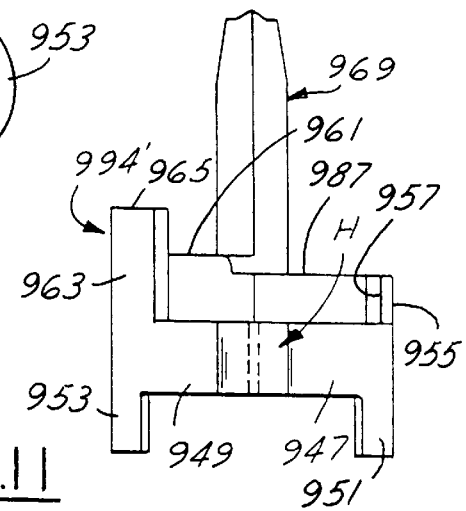

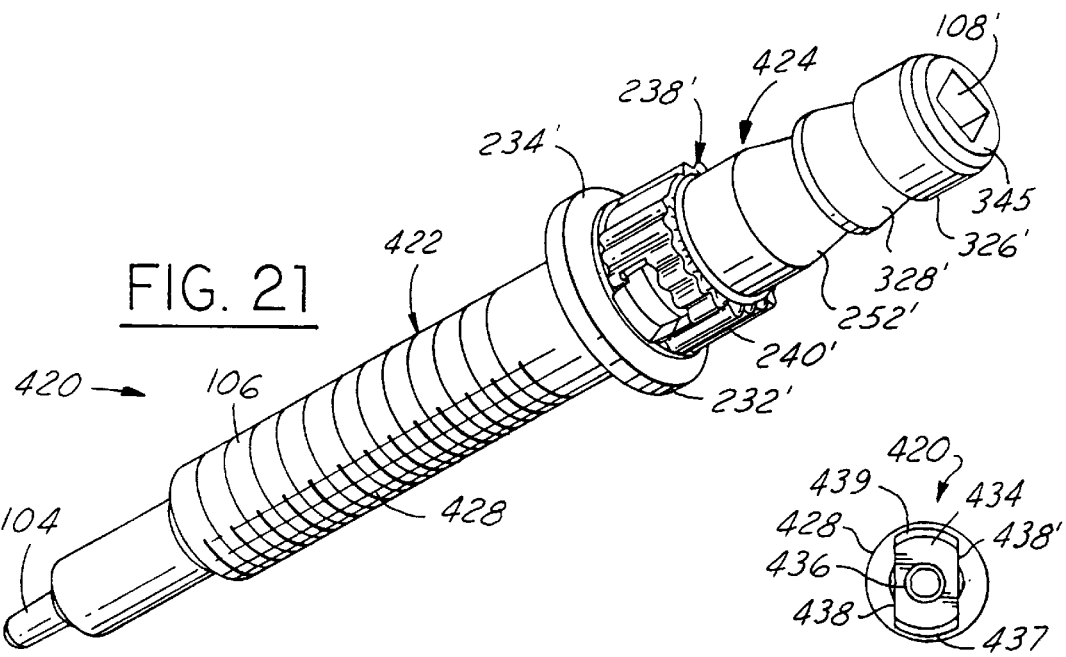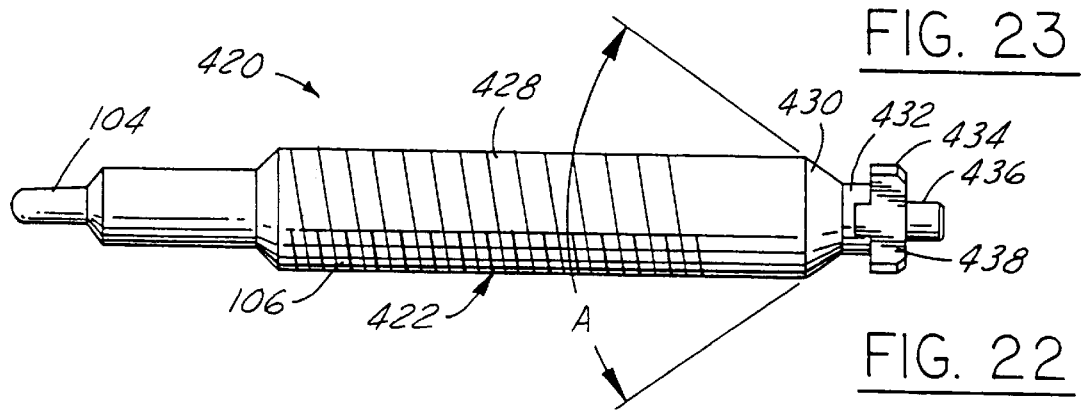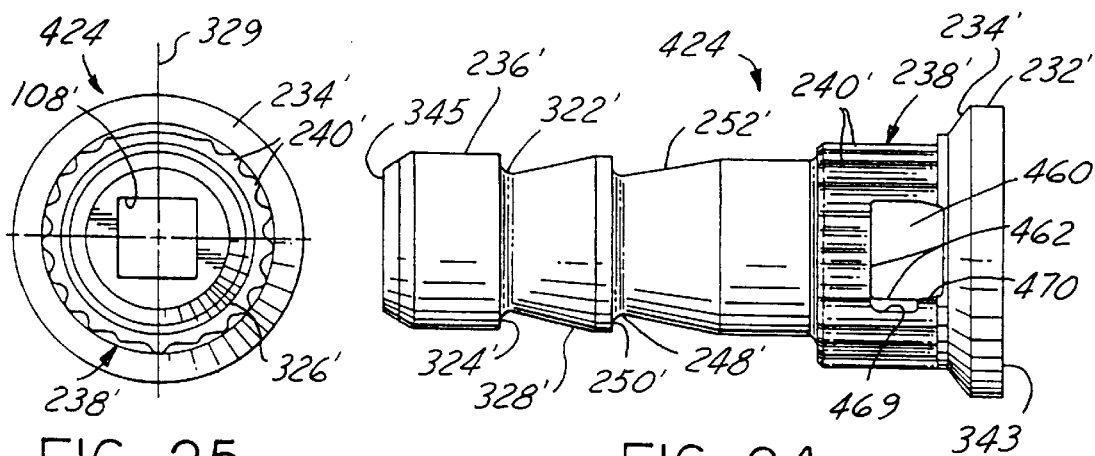

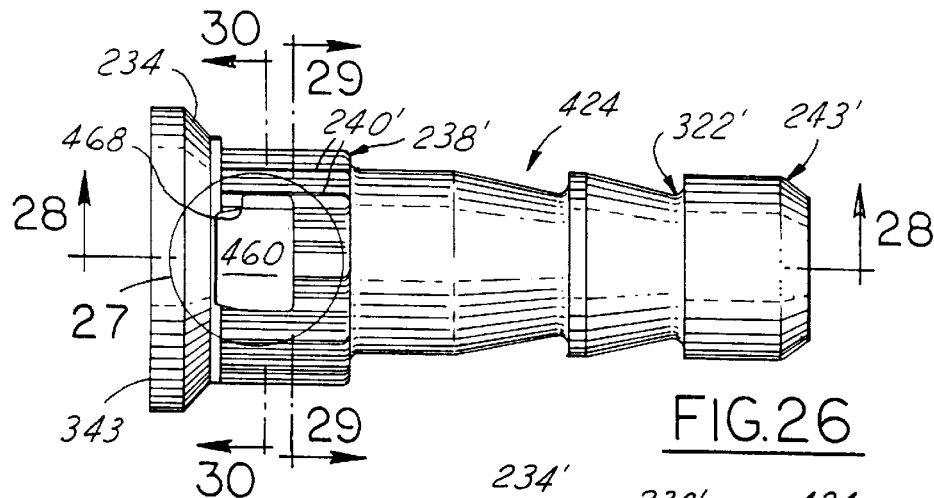
FIG.26
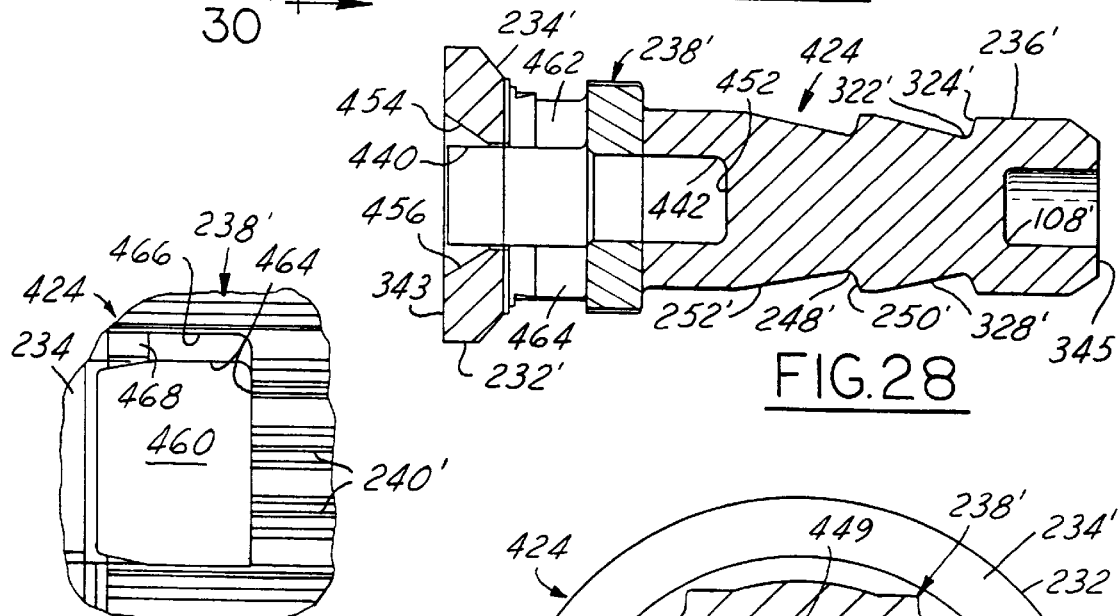
FIG.28
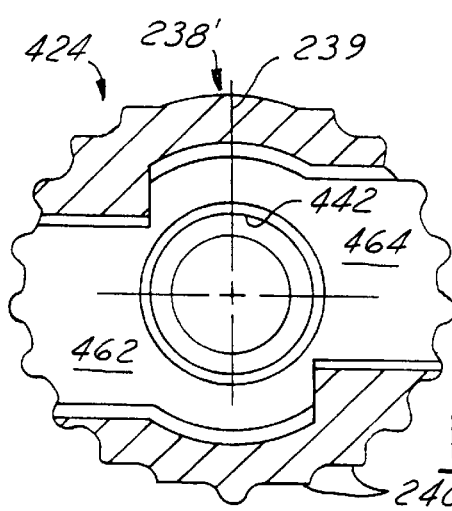
FIG.27
FIG.29
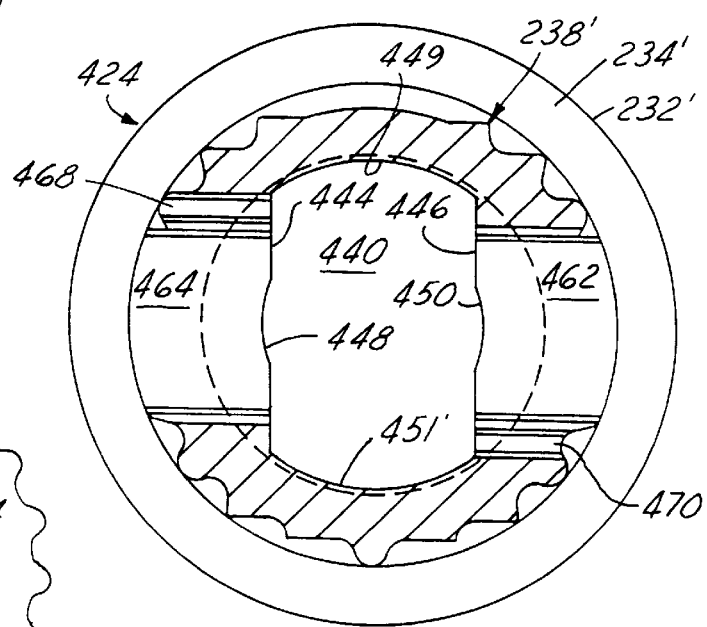
FIG.30

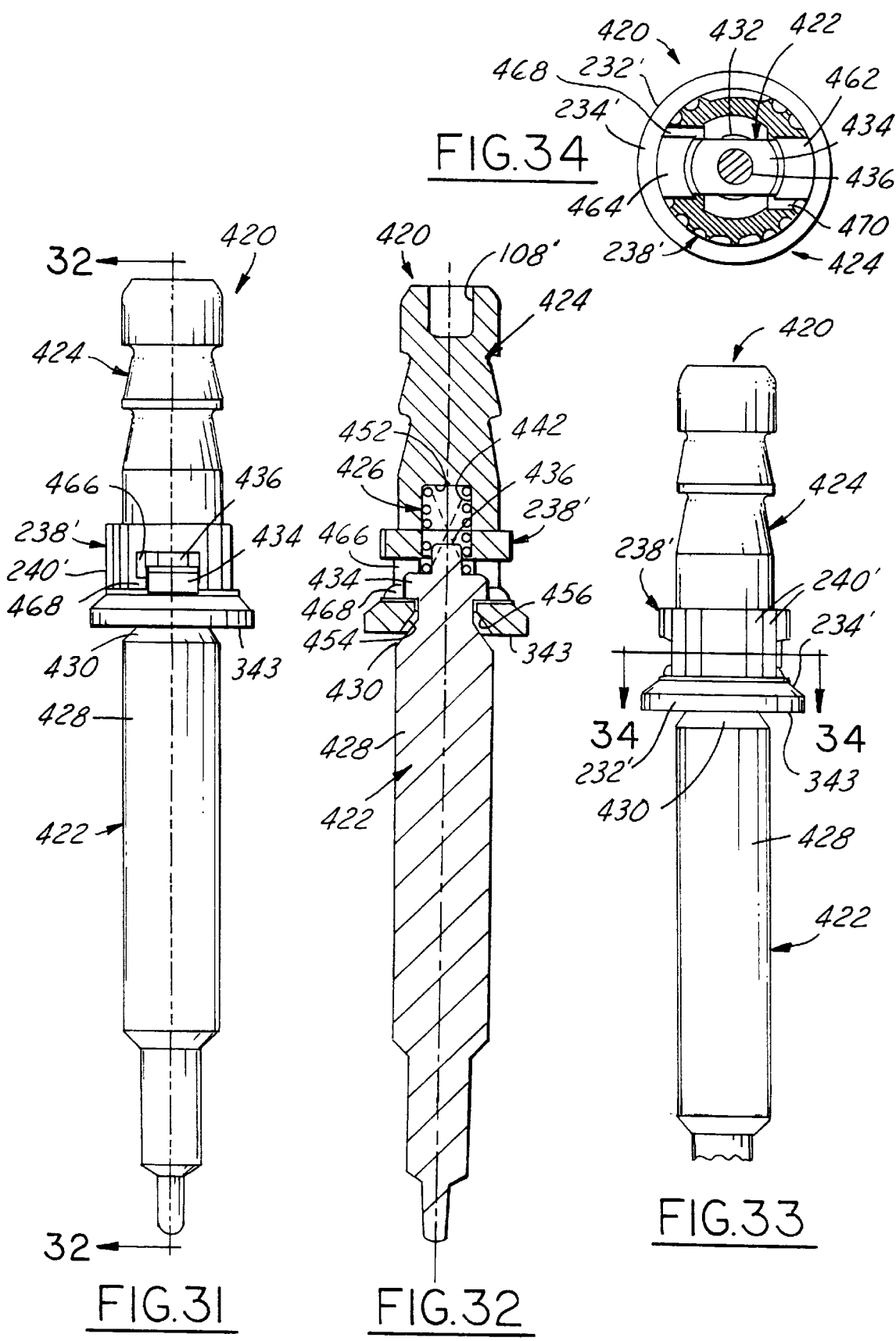

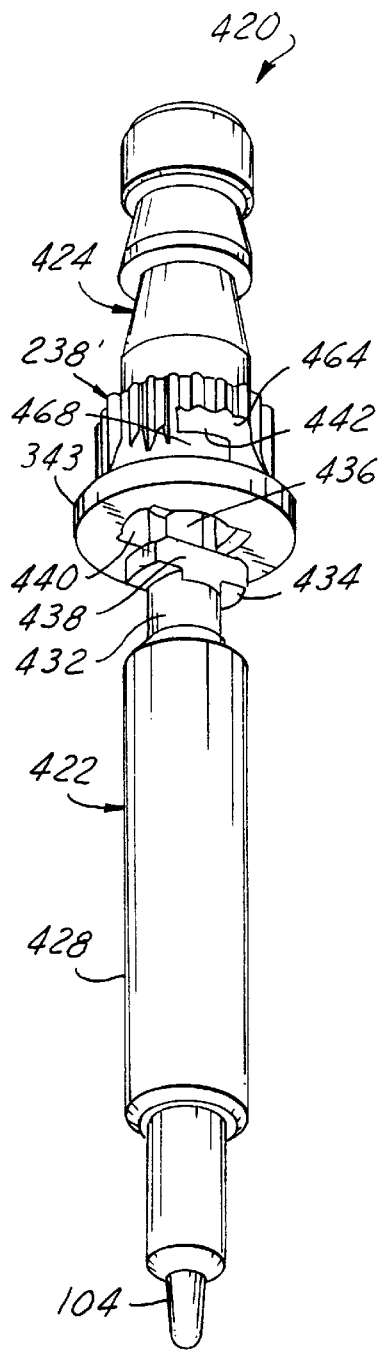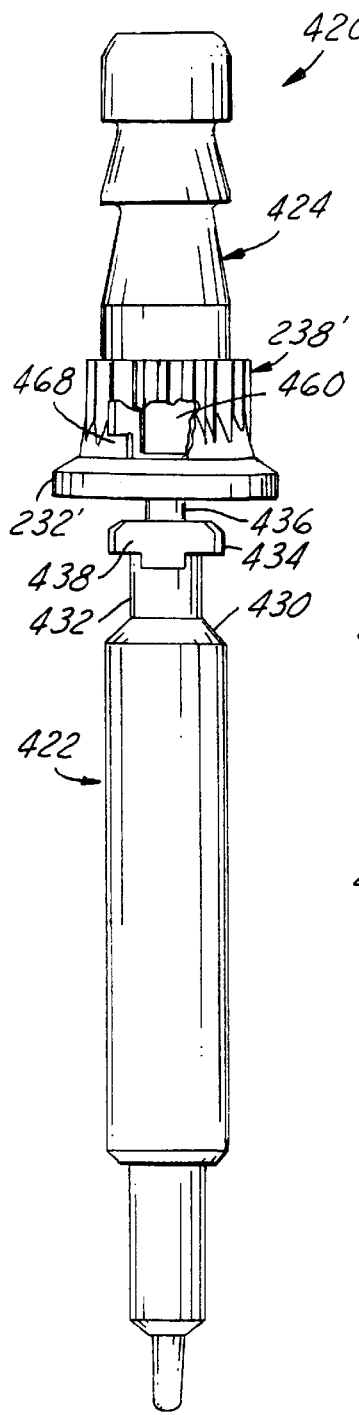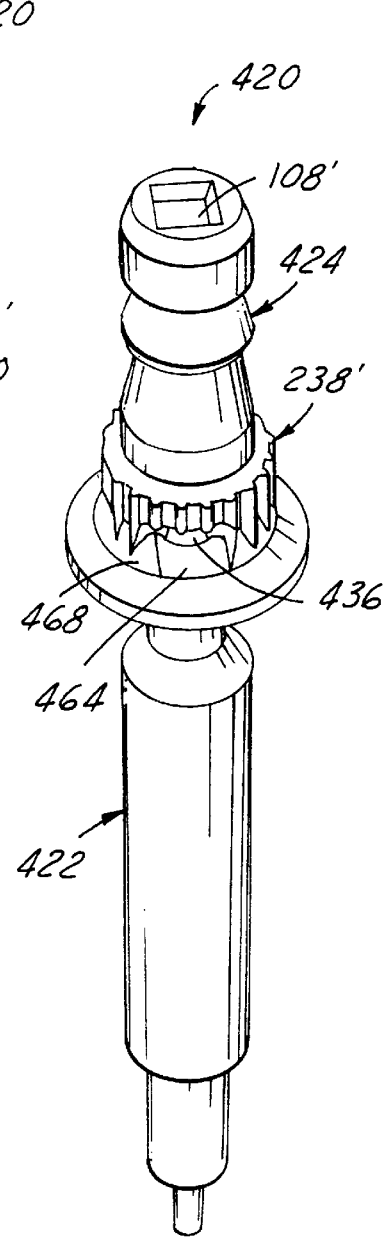

CARBURETOR NEEDLE VALVE AND LIMITER CAP INSTALLATION AND ADJUSTMENT APPARATUS

This application is a continuation-in-part of parent application Ser. No. 08/696,693 filed Aug. 14, 1996, now U.S. Pat. No. 5,753,148, and both this application and patent U.S. Pat. No. 5,753,148 claim the benefit under 35 U.S.C. §119 (e) of U.S. Provisional Application No. 60/002,931, filed Aug. 30, 1995.

FIELD OF THE INVENTION

This invention relates to carburetors for internal combustion engines, and more particularly to improvements in flow metering needle valves of the carburetor, needle caps for limiting rotational adjustment of the needle valves and cap orientors for facilitating installation and use of caps on the needles.

BACKGROUND OF THE INVENTION

In response to relatively recent federal and state "clean air" regulations, carburetor limiter caps have been used to restrict carburetor fuel flow metering valve adjustment to prevent the excessive emission of carbon monoxide and unburned hydrocarbons from internal combustion engine. Primarily, limiters have been used with conventional float bowl carburetors to control automobile exhaust emissions. More recently their use has been extended to diaphragm-type carburetors in small engines simply to prevent gross misadjustment of fuel flow. However, future emissions regulations are expected to extend the role of limiter caps to control engine emissions.

Fuel flow within a carburetor is commonly metered during no load or idle engine operation by an "idle" or "low speed" needle valve and during part of full load operation by "main" or "high speed" needle valve. Typically, each valve has a threaded cylindrical body with an enlarged knurled head at one end and a conical or needle shaped valve control surface at the opposite end which is received within an opening in the carburetor body. To calibrate fuel flow, each valve is rotatively adjusted to axially extend or retract the valve control surface within a fuel passage in the carburetor until optimum fuel flow through the passage is achieved. Pre-calibration of the carburetor on a flow test bench may be performed prior to being assembled to an engine. After assembly to an engine, it is customary to adjust the metering valves, if needed, to fine tune fuel flow to actual engine demand. Subsequent improper over adjustment (either too rich or too lean) of fuel flow by the engine-powered-appliance-end-user is prevented by affixing a limiter cap over the head of each valve.

These limiter caps generally consist of a cylindrical body having an opening at one end for axially receiving the valve head in tight fitting engagement to prevent removal and ensure rotation of both in unison. A recess in the opposite end of the cap is provided to enable an adjustment tool to engage the valve directly or the cap alone to rotate both in unison to make fuel flow adjustments. Projecting radially outwardly from the cap body is an arm for abutting against a fixed stop extending from the carburetor to limit valve rotation. Stop members such as an integrally cast projection of the carburetor or the body of another cap press-fit on an adjacent needle valve may be used to limit valve and cap rotation and hence adjustment. Removal and reorientation of the limiter cap, after calibration with the cap secured to the valve, is intentionally made impractical, if not impossible, for the end user by tamper proof cap construction that requires the application of considerable force to remove the limiter, possibly damaging or destroying the cap.

In the case of two-stroke cycle engines such limiter caps prevent the fuel flow adjustment range to be incorrectly set by the subsequent end-user, preventing over adjustment toward rich, that could increase emissions above clean-air standard, and also preventing over adjustment toward lean that could deprive the engine of lubrication entrained in the fuel flow, thereby leading to overheating or even catastrophic failure. However, the limited adjustment range permitted by the limiter cap does enable a user or operator of the power tool to adjust the necessary range of fuel flow to keep the engine efficiently operating under the full range of temperature, humidity, altitude or other engine operating conditions which may be encountered.

During manufacture of the carburetor, and also during subsequent assembly of the carburetor to the engine by the engine manufacturer, assembly and proper orientation of these limiter caps is difficult and requires considerable dexterity. If improperly oriented, its tamper proof construction virtually prevents removal without damaging the cap and disturbing the optimum fuel flow setting of the valve.

U.S. Pat. No. 5,236,634 Hammett et al ('634) and U.S. Pat. No. 5,322,645 Hammett et al ('645), both assigned to Walbro Corporation (assignee of record herein), disclose and claim improvements in limiter caps and methods of adjusting fuel flow which successfully overcome such problems, and are incorporated herein by reference.

The limiter caps of the '634 and '645 patents have operated successfully in commercial use to restrict adjustment of a valve to prevent excessive engine exhaust emissions and engine overheating or failure. They facilitate quick and easy assembly of the cap to a needle valve or a carburetor body and final calibration of the carburetor while operating on an engine without requiring the removal of the grommet and engine shroud after final carburetor calibration. These limiter caps may be individually installed after initial calibration of an assembled carburetor on a flow test bench and prior to performing final engine factory calibration of the carburetor on an engine.

They also allow assembly of the limiter cap onto a needle valve of the carburetor to enable rotational adjustment of each valve during carburetor calibration, simple and accurate positioning of the arm of each cap relative to the final adjusted positioned of the valve and carburetor stops, and easy assembly of the cap into secure locking engagement with the valve to allow rotation of the cap and valve only in unison while limiting rotational adjustment of the valve in either direction.

After being locked on they allow limited fuel flow adjustment to enable a user of an engine powered tool to adequately adjust carburetor performance to fine tune engine operation under a variety of operating conditions while preventing fuel flow over adjustment which otherwise could cause excessive exhaust gas emissions or engine overheating. The prepositioning feature allows quick and easy limiter arm orientation, after the caps are mounted in a freely rotating position on the valve, to expediently, yet accurately, fix the allowable range of valve rotation. Another advantage is that the cap may be carried on the valve during assembly without dislodging or vibrating free.

Despite the numerous features and advantages of the limiter cap and methods of adjusting fuel flow of the invention as disclosed and claimed in the aforementioned '634 and '645 patents, there nevertheless remained the longstanding and ongoing need to further reduce manufacturing and material costs of both the limiter caps and associated needle valves, to further simplify, facilitate and render more economical the handling, shipment, storage and installation of such caps on the associated needle valves as well as the adjustment of fuel flow using the needle valve, all without substantially modifying the outer shape and configuration of the type of limiter caps of the '634 and '645 patents. There was also an ongoing need to improve the function and operation of the limiter cap in association with the needle valve and to render the same more versatile as to choice of material usable in constructing the limiter cap. In addition there was the longstanding and overriding need to improve the construction of such limiter caps to enhance their tamper proof characteristics to meet present and proposed governmental and industry standards in this regard. There was also a need to be able to remove the caps, but only by authorized personnel, and without damaging the caps/or needle valves.

The improvements disclosed and claimed in the aforementioned parent application Ser. No. 08/696,693, filed Aug. 14, 1996, now U.S. Pat. No. 5,753,148 also assigned to Walbro Corporation (assignee of record herein), and which application is also incorporated herein by reference, provide improved limiter cap, needle valve, and cap orientor constructions and improved methods of utilizing the same, in the form of various alternative and/or cooperatively combinable embodiments, which satisfy the aforementioned needs, while still satisfying most if not all of the objects and retaining the describe features and advantages of the limiter cap embodiments and methods of the aforementioned '634 and '645 patents.

The improved limiter cap of the aforesaid parent application is of two-piece construction comprising a hollow cylindrical outer body carrying the limiter arm and a spring material retainer clip telescopically received within the outer body. The retainer clip is in the form of a hollow sleeve provided with inwardly and outwardly protruding resilient barbs reversely oriented relative to one another to respectively engage the cap body and the needle valve shank to respectively prevent, on the one hand, retrograde relative telescopic motion between the clip and the body, and on the other hand, between the clip and valve shank. Preferably the clip sleeve is split lengthwise to define a parting gap therein, and the sleeve has a free state diameter greater than that of the body so as to be readily compressible to ensmall the sleeve diameter to facilitate telescopic insertion of the sleeve into the cap body passage.

Due to this two-piece construction the limiter cap retainer clip can be made of spring metal material whereas the cap body can be made of either relatively rigid plastic material or metal. By transferring the resilient, spring locking function from the cap body plastic material to the metal retainer clip, less press-on force is required to telescope the limiter cap subassembly onto the needle valve shank, but the limiter cap can not be removed from the needle, except by authorized personnel using a special tool, without destroying the cap. Moreover, if the cap body is made of metal material, even destructive removal is forestalled.

The foregoing two-piece limiter cap construction is provided in one embodiment as a single stage cap for installation only to a locked-on position after engine factory fine tune adjustment with the cap off. In other embodiments a two stage type cap is provided for preassembly to the needle valve to a first position, allowing presetting paired caps to a rich-rich position, while permitting rotational adjustment of the needle valve during engine fine turning. After such adjustment the cap or caps are then pushed further onto the needle to lock the caps and needle for co-rotation to thereby define a predetermined and more limited end-user range of rotational adjustment of the needle valves. The seating of the single or two-stage caps in their locked first and/or second stage positions is made apparent to the installer by an audible click as the inwardly protruding spring barb(s) snap into a needle shank groove after riding over the needle head, and with a two-stage cap, subsequently riding over a second stage retaining shoulder on the needle shank.

To further facilitate engine customer installation of paired low and high speed limiter caps (of both the '634/'635 patent type as well as those of the aforesaid parent application) on the associated side-by-side carburetor installation of low and high speed needle valves, the invention of the parent application further provides various embodiments of "peanut clip" cap orientors and retainers. Both of the cap bodies are individually telescopically inserted into the peanut clip so that it encircles the cap bodies and spans a space therebetween to securely and conveniently hold the caps in a paired side-by-side subassembly for storage, shipment and/or telescopic installation and rotational orientation of the caps simultaneously on their respective needle valve shanks while still held by the peanut clip. The peanut clip then may be removed from the caps once the same are installed in final position, or the clip may be permanently retained on the caps as by orienting the cap limiter arms to capture the peanut clip therebetween by a flanking relationship to the cap limiter arms. The peanut clip is constructed to permit individual limited-range rotation of the caps for end-user engine tuning adjustment while also sufficiently restraining cap rotation so that needle settings are retained by clip restraint of the caps, either supplemental to or in lieu of the usual needle springs, to thereby prevent undesired rotation of the needles induced by engine operation vibration.

Preferably, for use with two-stage type limiter caps, one embodiment of the aforesaid peanut clip is constructed with a stop leg that ensures that initial push-on assembly of the subassembly of peanut clip and paired cap bodies held therein onto the needle ends is automatically stopped at the first stage installation position. After engine fine tuning adjustment by the engine manufacturer with the caps in their first stage position, the caps are directly pushed further within the clip into their locked second stage position while the clip is maintained in its initial position by its stop leg continuing to abut the carburetor body. The stop leg clip also has cap limiter arm entrapment extensions for locking the caps angularly in rich-rich orientation both prior to and after installation of the cap/clip subassembly to its first stage needle-installed position. When the caps are pushed further into the clip, from first to second stage position, the cap limiter arms are then clear of the clip extensions so that the caps (and associated needle valves) can be rotated through their limited adjustment range established by operation of the cap limiter arms.

The peanut clip may be a continuous loop of resilient but non-elastic material in which the clip peanut shape provides individual cap body gripping action for holding the caps in spaced parallel and pre-aligned relationship but also enables flexible deformation of the clip to accommodate unlocking override of orienting ribs and/or interengaging splines of the clip and cap body. In one form of the stop leg clip embodiment a parting gap is provided in the clip opposite the stop leg to thereby form cantilever spring legs to impart resilient deformability to the clip.

Improved forms of needle valves with shank grooves and cooperating barb retaining shoulders are also disclosed and claimed in the parent application that cooperate with the aforesaid improved limiter caps. These needle valves also have a cap abutment conical shoulder against which the inner end of the cap seats in the fully installed position to thereby hinder any improper attempt to pry off the cap with a screw driver blade.

Despite the numerous features and advantages of the several embodiments of the improved two-piece limiter caps, cooperative one-piece shouldered head needle valves and orientor peanut clips as disclosed and claimed in the aforesaid parent application, there nevertheless again remained the longstanding need to even further reduce manufacturing, material, installation and inventory costs of the improved one-piece shouldered head needle valves that cooperate with the improved two-piece limiter caps. It has also been found that there is a need to enhance the performance of the improved stop leg peanut clip embodiment that is used with the aforementioned two-stage needle valves and caps.

OBJECTS OF THE INVENTION

Accordingly, among the objects of the present invention are to provide further improved shouldered head needle valve constructions and an improved stop-leg type orientor peanut clip, in the form of various alternative and/or cooperatively combinable embodiments, which satisfy the immediately aforementioned needs, while still providing the advantages of the limiter caps, needle valves and orientor peanut clips of the aforementioned parent application and also those of limiter caps of the '634 and '645 patents.

SUMMARY OF THE INVENTION

In general, and by way of summary description and not by way of limitation, the present invention achieves the foregoing as well as other objects by providing, inter alia, an improved form of the peanut clip limiter cap holder as disclosed and claimed in the aforesaid parent patent application by interconnecting the free ends of the clip spring legs with a living hinge in the form of an arcuate, semi-circular spring web integrally joined at its opposite ends to the exterior surfaces of the respective leg free ends. This living hinge connector is resilient and flexes to yieldably distort as necessary to accommodate outward resilient flexing of the free end of either of the clip legs, or both concurrently, during insertion of the associated limiter caps into the retaining clip. The living hinge also retains the clip legs in their initial, as-molded orientation to thereby counteract any adverse effect from "creep" of the plastic material with aging, and thus insures preservation of the frictional gripping, spring action of the legs to prolong the effective friction grip service life of the clip.

The clip is also optionally provided with detent dimples, one on each of the interior surfaces of each of the spring legs near their free ends. These dimples cooperate with grooves in the limiter caps with a snap-in detent action to thereby enhance yieldable retention of the caps in the clip during shipment and installation as well as retention of the clip on the caps once fully installed.

When it is desired to utilize the dual cap holder clip for installation of a single limiter cap on a carburetor having only a single needle valve, the invention further provides a dummy stud mounted to the carburetor in the vacant needle valve position. The stud has a head that occupies the vacant limiter cap position in the holder clip. This enables the same dual clip/dual cap automated installation equipment to be utilized for assembling a single limiter cap while held in the dual cap clip, onto a single needle installation. The dummy pin also serves as an angular locator, additional support and as an anti-rotation stop for the holder clip when it is installed on the single needle in both the first and second stage positions of the single limiter cap on the needle valve while held in the clip.

The invention provides, still further, an improved needle valve wherein, instead of being conventionally manufactured as set forth in the aforesaid patent application as a one-piece member from bar stock in a Swiss-type precision automatic screw machine, the improved needle valve of this invention is made as an assembly of two principal parts, namely, a tip/shank part and a separate head part that is operably coupled to the shank part for rotatably driving the shank part. The tip/shank part is again made as a lathe-turned part having the needle tip flow control surface formed at one axial end, an elongated central barrel portion containing the needle mounting and adjusting threads that screw into the carburetor body, and a reduced diameter stem portion protruding from the axially opposite end of this shank part. The head part has the needle spring stop flange at its inner end, the fluted spline portion contiguous with the head flange, and the groove-and-shoulder cap barb retention structure formed between the spline portion and the outer end of the head part. The head part also has a shank stem receiving cavity formed therein opening at the head inner end, and which is constructed and arranged for telescopically receiving the shank stem portion to operably couple the shank and head parts together in assembly.

By so making the needle valve as a two-part assembly, significant costs savings can be achieved. The tip/shank part can still be made on a Swiss type precision automatic screw machine as basically a lathed-turned part, with the stem portion finish ground to the desired head interlock configuration as needed. However cost savings as obtained by a significant reduction in the initial diameter of the bar stock used to make this part due to the omission of the large diameter spring stop flange from this shank part.

The head part is then preferably made as a precision die casting so that both its interior and exterior surfaces are precision configured as a finished part in the as-cast condition. This insures reliable and precision formation of the flutes of the spline portion to ensure better mesh and slide-on fit of the internally splined portion of the associated limiter cap. Making the head part as a die casting also facilitates manufacture of a preferred form of tool adjustment recess in the outer end of the head, namely, a recess having a square cross sectional configuration that is formed by a complemental male core in the casting operation. In addition, the head part can be made as a standardized, one size-fits-all part, whereas the tip/shank part can be made in various lengths to accommodate different carburetor setups as well as individual customer deviations from initial design "turn out" needle specifications. This feature thus farther contributes to a substantial reduction in inventory costs as well as in carburetor manufacturing and assembly costs.

In one embodiment of the foregoing improved needle valve assembly, the shank stem is press fit into the head cavity to permanently join the shank and head parts in fixed relationship. In a second embodiment, the shank stem is positioned as a mold insert so as to be cast embedded in the head part during casting of the head. Hence the stem receiving cavity in the head is formed as a contiguous body of metal about the shank stem portion to thereby likewise permanently join the shank and head in fixed relationship.

In a third and preferred embodiment of the improved needle valve assembly, the shank stem is formed with a radial cross arm, and the head part stem-receiving cavity is constructed and arranged, by use of suitable retractable mold cores, to cooperate with the shank stem and cross arm thereof to form a telescopic, quarter-turn and retrograde-relative-motion-type bayonet coupling for releasably operably coupling together the shank and head parts of the needle valve assembly. When the needle valve assembly is installed on a carburetor, the main needle valve compression coil spring that is sleeved over the shank part abuts at its ends between the carburetor body and the head part flange to bias the bayonet coupling to fully locked condition. Hence, the head part can be moved telescopically by limiter cap abutment of the head part flange during movement into the final stage installation position when installing such cap on the "longer" needle of a non-flush side-by-side pair of needle valve assemblies. This axial lost motion capability of the bayonet coupling insures lock-on of the retention barbs of the companion cap for the head part barb-retaining groove of the "shorter" needle, and thus lock-on of both of the side-by-side needle caps while being held by the orienter peanut clip cap holder.

Preferably the shank part stem and cross arm also have a slight radial clearance fit in the head part cavity in the coupling lock-up condition that permits slight relative lateral motion or "side-play" between the head and shank parts during limiter cap installation. This radial play of the head on the shank part thus isolates the shank part of the needle valve assembly from the forces that would otherwise be imposed on the heads by manufacturing tolerance deviations in the holder clip and/or limiter caps, thereby substantially reducing if not eliminating the adverse fuel flow control effects that can result from imposing bending stresses on the needle shanks when installed in the carburetor.

BRIEF DESCRIPTION OF THE DRAWINGS

The foregoing as well as other objects, features and advantages of the present invention will become apparent from the following detailed description, accompanying drawings and appended claims in which presently preferred embodiments of the invention are set forth in sufficient detail to enable a person skilled in the art to practice the invention in connection with the best mode presently known of making and using the invention.

The various views of the accompanying drawings (which are drawn to engineering scale unless otherwise indicated), may be briefly described as:

FIGS. 5 and 6 are fragmentary part center sectional, part elevational views, FIG. 5 illustrating the first stage of installation (on side-by-side needle valves of the aforesaid parent application) of the subassembly of the two-stage orientor peanut clip of this invention with the two-piece limiter cap of the aforesaid parent application, and FIG. 6 illustrating the limiter caps pushed inwardly to their second stage position on the needle valves:

FIG. 7 is a side elevational improved the orientor peanut clip of this invention shown by itself:

FIGS. 8 and 9 are end elevational views of the axially opposite, right hand and left hand ends respectively of the peanut clip as viewed in FIG. 7;

FIG. 10 is a cross-sectional view taken on the line 10—10 of FIG. 7;

FIG. 11 is a bottom plan view of the orientor clip of FIGS. 7–10;

FIG. 21 is a perspective view of a second embodiment of an improved two-piece needle valve assembly of the present invention.

FIG. 22 is a side elevational view of the tip/shank part of the two-piece needle valve assembly of FIG. 21.

FIG. 23 is an end elevational view of the right hand end of the part shown in FIG. 22;

FIG. 24 is a side elevational view of the head part of the two-piece needle valve assembly of FIG. 21, showing therein the side of the head opposite that seen in FIG. 21 and enlarged in scale thereover;

FIG. 25 is a end elevational view of the left hand end of the head part as seen in FIG. 24, and enlarged in scale thereover;

FIG. 26 is a side elevational view of the head part of the two-piece needle assembly as reviewed in FIG. 21 but shown by itself and enlarged in scale over that of FIG. 21;

FIG. 27 is a fragmentary view of that portion of FIG. 26 encompassed by the circle 27 therein and enlarged in scale thereover;

FIGS. 28, 29 and 30 are sectional views taken respectively on the lines 28—28, 29—29 and 30—30 of FIG. 26, FIGS. 29 and 30 being enlarged in scale over that of FIG. 26;

FIG. 31 is a side elevational view of the two-piece needle assembly shown in FIG. 21;

FIG. 32 is a cross-sectional view taken on the line 32—32 of FIG. 31;

FIG. 33 is a fragmentary elevational view of the needle valve assembly as shown in FIG. 32 and thus oriented to be rotated positionally 90° from the showing of FIG. 31;

FIG. 34 is a cross sectional view taken on the line 34—34 of FIG. 33 and slightly enlarged in scale thereover;

FIGS. 35, 36 and 37 are slightly exploded views illustrating the tip/shank part aligned for assembly into the head part of the needle valve assembly of FIGS. 21–30, FIG. 36 being an elevational view and FIGS. 35 and 37 being perspective views looking respectively from the tip and head ends of the assembly;

DETAILED DESCRIPTION OF THE PREFERRED EMBODIMENTS OF THE INVENTION

Figure 1:
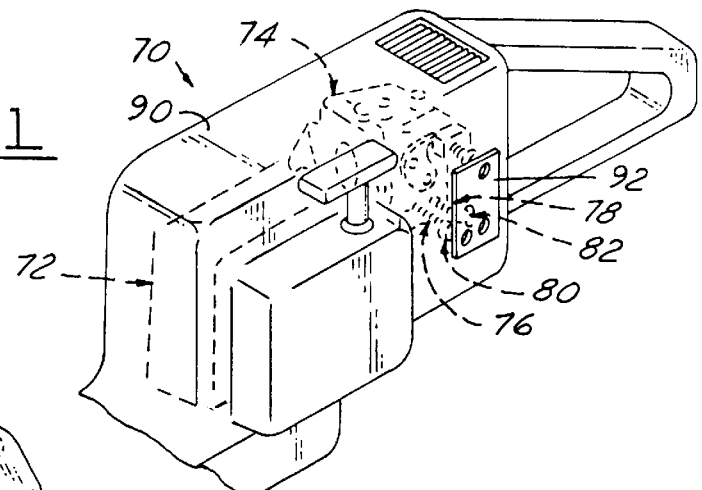
FIG. 1 is a fragmentary perspective view of a hedge trimmer having a two-cycle engine equipped with a carburetor having installed thereon fuel flow metering needle valves of the present invention and limiter caps of the aforesaid parent application.

With reference to the drawings, FIGS. 1–4 and the reference numerals appearing therein correspond to like figures and reference numerals of the aforesaid Hammett et al '634' and '645 patents, and illustrate an example of the environment in which the improved needle valves and orientor peanut clip of this present invention may be utilized.

Figure 2:
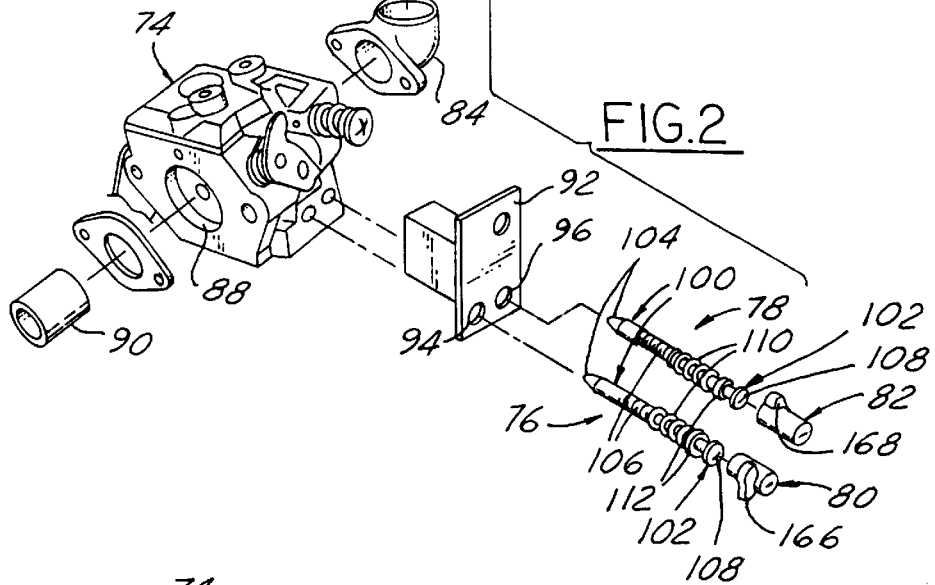
FIG. 2 is an exploded perspective view of the carburetor, main and idle needle valves, and limiter caps for each valve.
Figure 3:
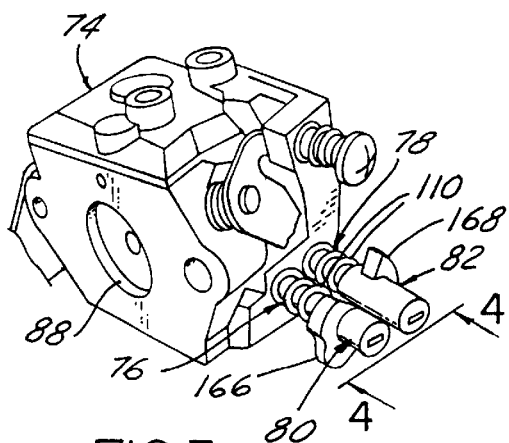
FIG. 3 is a perspective view of the carburetor of FIG. 2 illustrating both the main and idle needle valves of this invention and the associated limiter caps mounted on the carburetor.
Figure 4:
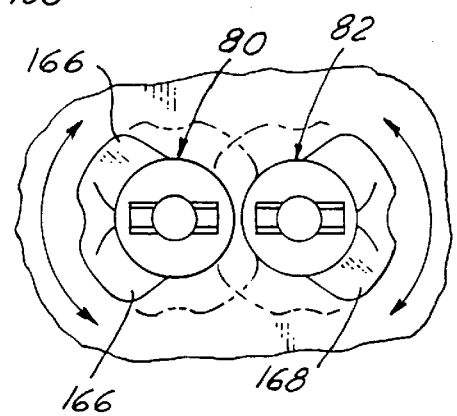
FIG. 4 is a fragmentary view looking in the direction indicated by the line 4—4 of FIG. 3 and diagrammatically illustrating user adjustment range of the needle valves with limiter caps locked thereon.

FIGS. 1 and 2 thus illustrate a typical assembly of a hand-held power tool 70, such as a hedge trimmer, with a two-cycle gasoline engine 72 having a carburetor 74 equipped with idle 76 and main 78 needle valves and respectively associated limiter caps 80 and 82 of the '634 and '645 patents. Caps 80 and 82 and needle valves 76 and 78 are preferably replaced by those of the aforesaid parent application as set forth therein, and likewise the needle valves of such disclosures replaced by the improved two-piece needle valve of the present invention, as set forth in more detail hereinafter. The idle and main needle valves 76 and 78 control fuel flow during low speed and high speed engine operation respectively.

Carburetor 74 has an air inlet 84 attached to an air cleaner 86, and an outlet 88 in communication with an intake manifold 90 of engine 72. Engine 72 and carburetor 74 are enclosed by a housing or shroud 90 having a cover plate grommet 92 to shield the carburetor and engine from cuttings and other debris, and provided with a pair of access openings 94 and 96 respectively axially aligned with caps 80 and 82. Caps 80 and 82 enable limited valve adjustment and grommet 92 also hinders tampering with or removal of either cap by the end user of power tool 70. However since cover grommet 92 must be made removable for field service of needle valves 76 and 78, it does not provide a fool-proof tamper guard.

All embodiments of the needle valve of the invention as described hereinafter share certain features in common which are standard parameters of conventional carburetor needle valves. Thus, as shown in FIG. 2 each valve 76, 78 has an elongated generally cylindrical shank 100 with a head 102 at its outer end and a generally conical valve control surface 104 at its inner end.

Shank 100 has a plurality of external threads 106 to engage complementary threads (not shown) within the carburetor body to enable threaded securement of valve 76, 78 therein and axial adjustment of the needle control surfaces 104 within a fuel flow passage of the carburetor body. Typically a recess or slot 108 is provided in the outer free ends 102 of valves 76, 78 for receiving an adjustment tool, such as the blade of a screw driver, for facilitating individual rotational adjustment of valves 76, 78. Additionally or alternatively, the outer peripheral surface of heads 102 may be provided with a knurled surface (not shown) which may be engaged by a tool or gripped manually for needle valve adjustment. Unintentional valve rotation induced by engine vibration is prevented by a coil compression spring 110 encircling the valve shank 100 and abuttedly retained in compression between the side of the body of carburetor 74 and a flange 112 located on valve shank 100 adjacent valve head 102.

Peanut Clip: Improved Embodiment

FIGS. 5–11 illustrate an improved embodiment of a peanut clip 994' of the invention which is identical to clip 994 as shown and described in the aforesaid parent U.S. Pat. No. 5,753,148 (and like numbered herein) except for the addition of two features which enhance retention in clip 994' of the limiter caps 300H and/or 300L (also described and shown in the aforesaid parent application), and likewise enhance retention of clip 994' on the limiter caps in their second stage, fully installed condition on the associated needle valves.

For this purpose, and as the first modification feature of clip '994 over the clip 994, the free ends of clip spring legs 947 and 949 are interconnected by a living hinge H in the form of an arcuate, semi-circular web integrally joined at one end to the exterior surface of leg 947 and at the other end to the exterior surface of leg 949, as best seen in FIGS. 7, 8 and 9. The width of hinge H is preferably the same as the full width of legs 947 and 949 and is of uniform thickness about its radius of curvature. Hinge H is resilient and flexes to distort as necessary to accommodate outward flexing of the free end of either leg 947 or leg 949, or both concurrently, during insertion of the associated limiter caps into the retaining clip 994' in the manner as described in the parent application with reference to clip 994 therein. Hinge H also helps retain legs 947 and 949 in their initial, as-molded orientation to thereby counteract any adverse effect from "creep" of the plastic material with aging and thus insure preservation of the frictional gripping, spring action of the legs to prolong the effective friction grip service life of the clip.

Figures 12, 13:
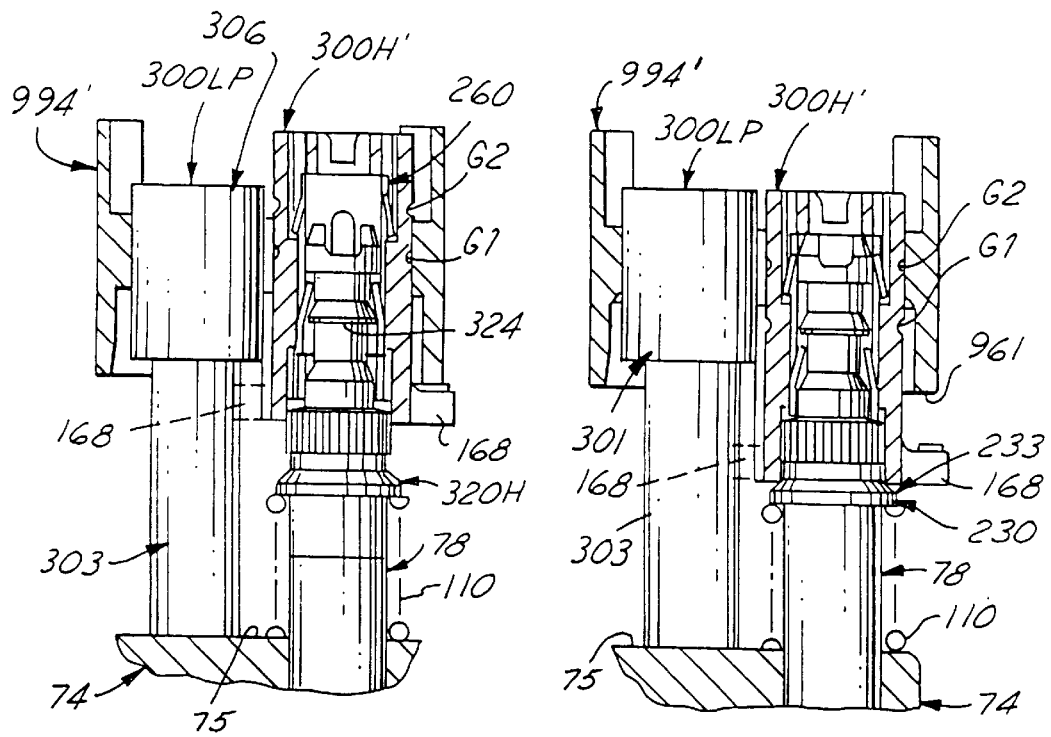
FIGS. 12 and 13 correspond to FIGS. 5 and 6 respectively but illustrate the use of the orientor peanut clip of FIGS. 5–11 as used on a single-needle carburetor equipped with a dummy limiter cap stud that is received in the cap-vacant cavity of the peanut clip and affixed on the carburetor in the needle-vacant position for such use.

The second modification feature provided on clip 994' has been described previously in the aforesaid parent application with respect to clip 994, but is more particularly illustrated in FIGS. 8, 9 and 10, and comprises a pair of integrally molded detent dimples D1 and D2 provided respectively on the interior surface of legs 947 and 949 near their free ends adjacent gap 945. Limiter caps 300H and/or 300L are then provided with a pair of axially spaced circumferential continuous external grooves G1 and G2, as shown by way of example on limiter cap 300H' in FIGS. 12 and 13. Groove G1 is designed to register with a snap-in detent action with dimples D1 and D2 in the first stage installed position of the associated limiter cap in the clip (FIG. 12). Likewise, groove G2 is oriented by design to register with dimples D1 and D2 in the second stage installed position of the associated cap in the clip (FIG. 13). The dimples and grooves thus provide a spring retention action to enhance yieldable retention of the caps in the clip during shipment and in the installation procedure described previously, and then enhance retention of the clip on the caps once fully installed when it is desired that the clip remain attached to the limiter caps for the duration of the service life of the carburetor in end use. The enhanced retention of the clip on the caps in both the first and second stage of cap insertion also helps resist the push-off forces exerted by the single light biasing compression coil spring, as described in the aforesaid parent application, that may be sleeved over the stop leg 969 to serve as a replacement for both needle valve springs 76 and 78 or 110.

As set forth in more detail in the aforesaid parent application, to install the subassembly of peanut clip 994' with caps 300L and 300H fully seated therein as in FIG. 5, clip 994' in utilized in the same manner as clip 994. Thus the clip is gripped at its outer sides 951 and 953 and oriented as shown in FIG. 5 to telescope the open ends of the caps, limiter-arm-end first, over the needle head. The peanut clip is then pushed toward face 75 of carburetor 74 until further push-on motion is stopped as leg toe 977 of stop leg 969 enters recess 985 in carburetor face 75 (not shown), and end face 979 of foot 975 abuts a recessed spot face 983 in carburetor face 75 (not shown, but which is described and shown in FIGS. 1, 3 and 4 of the aforesaid parent U.S. Pat. No. 5,753,148). Stop leg 969 thus automatically positions caps 300L and 300H to register the two-stage interior retainer clip 260 of each cap 300L, 300H in its first stage position shown in FIG. 5. In this position the inwardly protruding barbs 156 of the retainer clips have snapped into the grooves behind the needle head, and hence the caps cannot be withdrawn from the needles once in this first stage installation position. It will be recalled from the previous introductory description herein that in the first stage the caps are free to rotate on the needles because the cap spline flutes 204 have not as yet engaged the needle shank splines 240 in this first stage condition. Hence with the caps so peanut-clip-installed, the needle valve heads can be directly engaged with an adjustment tool and factory adjusted to fine tune the engine as described previously to the desired rich-rich limits for the end-user adjustment range. It will be noted that the caps are held against rotation during such adjustment by the limiter arms being locked against rotation by the locking extensions 955/957 and 963/967 of peanut clip 994'.

After the first stage engine adjustment has been performed, caps 300L and 300H may be individually or conjointly pushed inward toward the carburetor to the second stage position shown in FIG. 6. This engages the cap splines with the needle splines so that the caps and needles can rotate only in unison. However, peanut clip 994' remains leg-stopped in its first stage position when the caps are pushed to their second stage position due to the abutment of clip leg foot face 979 with the carburetor stop face 983. Hence this relative movement between the caps and peanut clip (as the caps are pushed in from the first to the second stage position) moves limiter arm 166 axially beyond the inner radial edge 987 of clip locking extension 955 (FIGS. 6 and 11), and likewise moves limiter arm 168 axially beyond the inner radial edge 965 of clip extension 963 (FIGS. 6, 7 and 11). Thus each of the limiter caps 300L and 300H is now rotationally unlocked from peanut clip 994 and is free to be rotated within the range established by the associated limiter arm, i.e., by the circumferentially opposite radial end faces of each limiter arm alternately abutting the outer surface of the mutually adjacent limiter cap, as described previously.

If desired, peanut clip 994' may then be pulled off of the fully carburetor-installed and needle-locked limiter caps for reuse with another pair of limiter caps to be preinstalled therein as described previously. However, preferably clip 994' is retained on the caps during use of the carburetor on an engine powered appliance. The frictional grip of the peanut clip on the caps helps retain them set in whatever adjusted position is desired, and resists unwanted cap rotation due to engine operational vibration.

Single-Needle Carburetor Embodiment

FIGS. 12 and 13 illustrate a modification to the carburetor when the same is of the type having only one mixture adjustment needle, such as the high speed needle 320H. In such applications of the dual limiter cap orientor peanut clip 994 or 994', the dual pocket clip carries only one limiter cap 300H or 300H' in the associated clip pocket. The carburetor 74 is then modified to mount a stabilizing pin 300LP in the needle-vacant position normally occupied by the low speed needle valve. Preferably pin 300LP is a cold headed solid stud having a cylindrical head 301 with an O.D. the same as that of limiter cap 300L to substitute fit in its cap-vacant clip pocket. Pin 300LP has a reduced diameter shank 303 which is seated into a blind bore formed in carburetor body 74 for press fit retention therein of shank 303. Pin head 301 has an axial length and orientation so as to protrude through and beyond the side edges of clip legs 947 and 949 in the installed condition of clip 994' with its stop leg 969 abutting the carburetor body (as described previously). When clip 994' is provided with the clip leg detents D1 and D2, preferably pin head 301 is likewise provided with a circumferentially continuous groove (not shown) designed to register with these detents when the peanut clip 994' reaches its leg-stopped installed position of FIGS. 12 and 13.

Pin 300LP serves as an angular locator, additional support and as an anti-rotation stop for clip 994 or 994' when installed on needle 320H in either the first or second stage positions of the limiter cap 300H'. Thus adjustment rotation of needle 320H in the first stage position of limiter cap 300H', and likewise adjustment rotation of the limiter cap 300H' in the second stage position thereof (FIG. 13), tending to bodily rotate the clip about the axis of needle 320H, is prevented by pin 300LP. The frictional grip of the peanut clip 994' on pin head 301, as well as yieldably detent dimple engagement when provided, also enhances the retention of the clip, when fully installed on the carburetor, against push off forces induced by engine vibration and/or the aforementioned light biasing spring when present on stop leg 969.

First Embodiment of Variable Length Needle Valve

FIGS. 14–19 illustrate a first embodiment of modified, two-piece needle valve 320' which, by way of example, is configured similar to that of the previously described needle valve 320. However, the modified needle valve 320', instead of being machined as a one-piece stainless steel member (typically on a Swiss-type automatic screw machine), needle valve 320' is initially made as two separate pieces which are then permanently joined together to form a single complete needle valve. In this way the overall needle length can be made selectively as a function of one or both of the lengths of the separate pieces, and/or the extent of telescopic overlap at their juncture. Also, the mode of manufacture can then be selectively varied as between the respective pieces to better optimize such parameters as manufacturing costs, performance, function, inventory costs and application flexibility.

Figure 14:
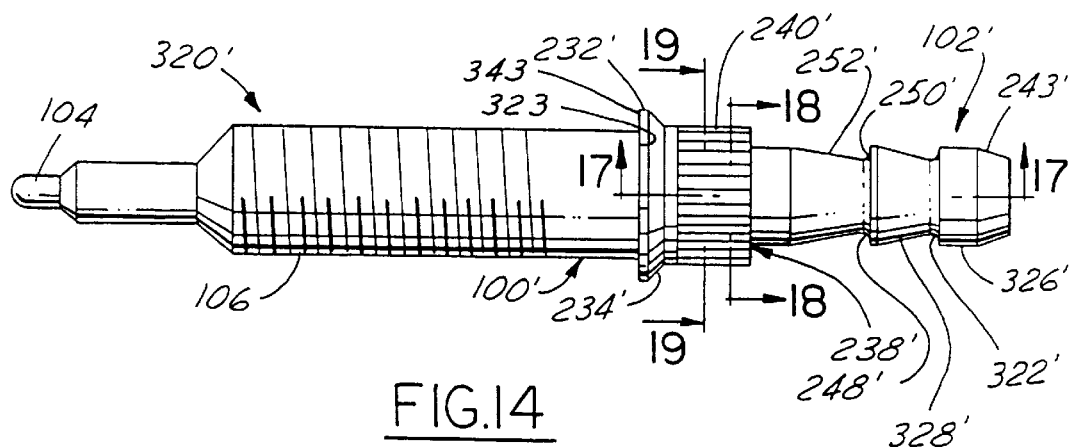
FIG. 14 is a side elevational view of a first embodiment of an improved two-piece needle valve of the present invention shown by itself.
Figure 16:
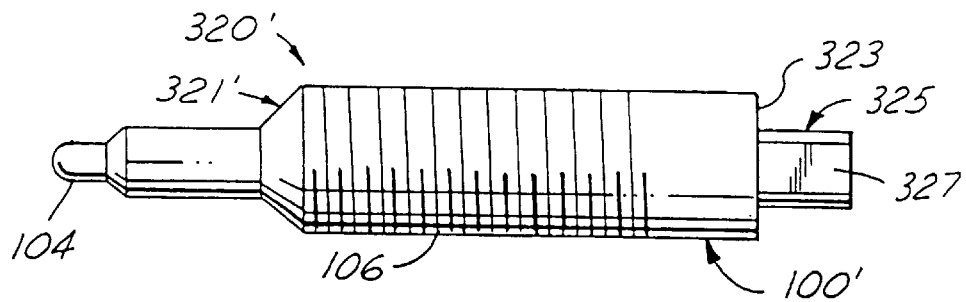
FIG. 16 is a side elevational view of the valve-needle/threaded shank part of the two-piece needle valve FIG. 14 shown by itself.
Figure 17:
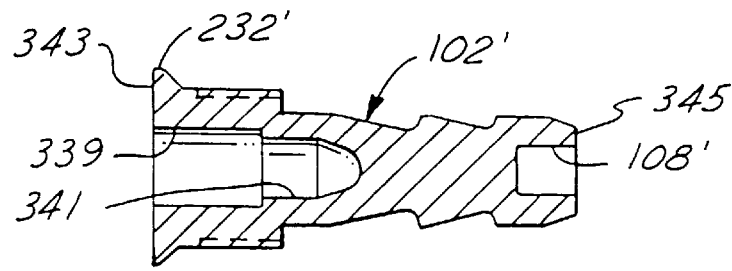
FIG. 17 is a cross-sectional view taken on the line 17—17 of FIG. 14 showing the head part of needle valve by itself.

Needle valve 320' is thus sub-divided into the tip/shank part 100' and the head part 102', these two parts being shown assembled in FIG. 14 as needle valve 320' and shown disassembled and separate in FIGS. 16 and 17 respectively. Shank part 100' has the valve control surface 104 formed as a tip at its inner end, and the main shank portion (largest diameter portion of the piece) has the threads 106 formed thereon. Shank part 100' terminates at its outer end (the end remote from tip 104) in a radial shoulder face 323 having a cylindrical (interrupted) rabbit stud 325 protruding coaxially therefrom of reduced diameter and of predetermined axial length. A pair of diametrically opposite flats 327 and 327' (FIGS. 16 and 19) are ground on stud 325 for its full axial length.

Needle head part 102' is preferably cast in one piece, and preferably as a precision die casting of zinc alloy metal cast into the finished configuration and dimensions (shown to scale) in FIGS. 14, 15 and 17–19. When die casting in permanent metal molds, typically no finishing operations are required on head 102' and it can be used in its as-cast condition to cooperate with the two-piece limiter caps of the invention of the parent application. The various configurational features of head 102' have been as described previously in conjunction with one piece needle 320 of the aforesaid parent application and hence are identified by like reference numerals raised by a prime suffix and their description not repeated.

Figure 15:
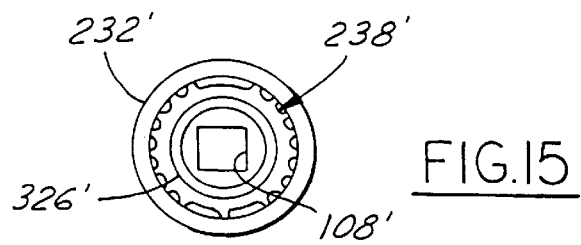
FIG. 15 is an end elevational view of the right-hand end of the needle valve as viewed in FIG. 14.

Preferably, the rotational tool socket 108' at the outer end of the needle 320' is of square cross-sectional configuration as shown in FIG. 15. The splines 240' of part head 102' differ somewhat from splines 240 of the machined one-piece needle 320, i.e., the cross-sectional configuration of splines adjacent the mold parting line being modified to the configuration and layout shown in FIGS. 18 and 19 to accommodate manufacture in a split mold having a parting line 329. Thus, as indicated by phantom showing in FIGS. 18 and 19, in order to permit parting of the mold along parting line 329, two splines 331 and 333 are omitted at the upper side of the head adjacent the parting line, and two splines 335 and 337, one on either side of the central bottom spline (bisected by parting line 329), are likewise omitted, thereby preventing hang-up with the mold cavity surface upon parting open of the mold.

The inner end of head 102' (i.e. that end facing shank part 100') is provided with a cylindrical bore 339 concentric with the O.D. of the head and opening at the head inner end face 343. Bore 339 at its inner end opens into a reduced diameter counterbore 341 having a bullet nose blind end. The axial dimension of bore 339 is slightly greater than that of rabbit stud 325, but the diameter of bore 339 is made slightly less than the O.D. of the cylindrical portion of stud 325. The axial dimension from end face 343 of head 102' to the flat outer end face 345 thereof corresponds to the like dimension of the integral head portion of a single piece needle 320' it is to replace. Likewise, the axial dimension from the end of tip 104 to the shoulder face 323 of the shank part 100' corresponds to the tip-to-shoulder dimension of the one piece needle 320. Hence, when head 102' is fully assembled onto shank part 100' with head face 343 abutting shank face 323 (FIG. 14), the total overall axial dimension of the two-part needle 320' is by design the same as the overall axial dimension of the single piece needle 320 it is intended to replace.

Figures 18, 19:
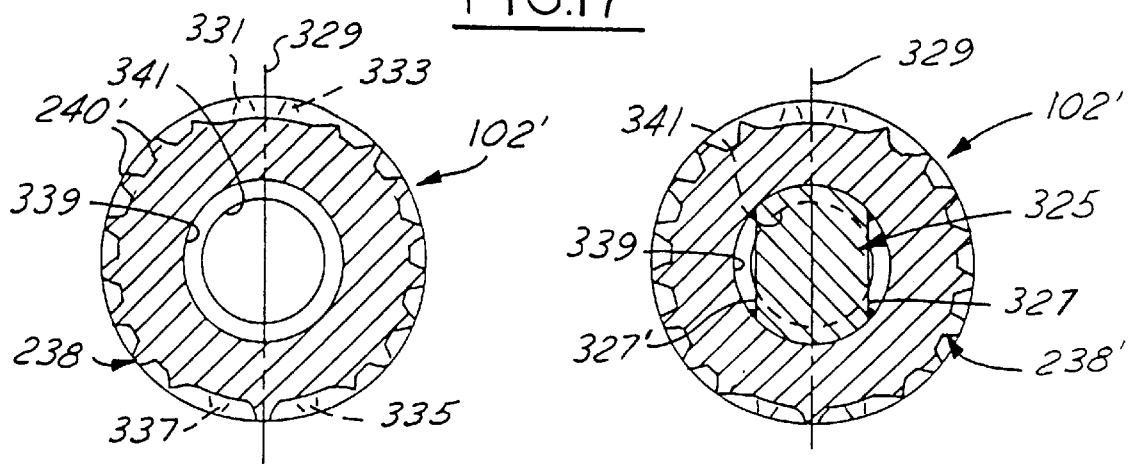
FIGS. 18 and 19 are cross-sectional views taken respectively on the lines 18—18 and 19—19 of FIG. 14.

Preferably, shank part 100' is held permanently affixed to head part 102' by a force fit of stud 325 into bore 339 so that a slight upset broaching action occurs at each of the four junctions of the edges of flats 327, 327' with the cylindrical portion of the stud periphery, as indicated into somewhat exaggerated fashion in FIG. 19. The broaching, force fit entry of stud 325 into bore 339 thus provides a substantially permanent joinder of the two parts that prevents relative rotation therebetween as well as axial separation.

As indicated previously in conjunction with the description of the cap orientation peanut clip 994 of the aforesaid parent application, the specifications for a given model carburetor designed for use on a customer's engine of given specifications will have a specified number of "turns out" of the needle from needle bottomed position. This is correlated with needle thread pitch to optimize an initial needle setting for the engine prior to any adjustment of the needles when the engine is running. Normally this is designed so that the shoulders 230 and 232 of both low and high speed needles 320L and 320H are also thus flush with one another at carburetor "turns out" spec. Hence, the overall axial dimension of the two-part needle 320', when the two needle pieces are fully telescoped in assembly (FIG. 14), like the corresponding dimension of the one piece needle 320, is designed to establish this flush condition of the needle shoulders 230, 230' of the adjacent high and low speeds needles in a given application.

However, it often occurs that the engine customer desires to deviate the "turns out" specification, without otherwise changing the carburetor or engine specification, in order to better optimize initial needle settings prior to engine-run needle adjustment; such as when using the same engine to drive different loads, e.g., different chainsaw lengths driven from the same engine in two models of an engine-powered chainsaw appliance. Under these conditions one of the two high and low speed needles will be effectively shorter in length than the other relative to the leg stop surface recessed into the carburetor face 75. Thus when using the cap orientor peanut clips 994 or 994' in such a situation, when that limiter cap which is inserted onto the "longer" needle reaches first stage position, the companion limiter cap on the "shorter" needle may not be "locked on". Of course the same is true for this type of set up in the second stage clip-installation position of the two caps. However, if this occurs in the second stage position, a defective cap installation will thus result under these conditions unless that needle valve having the shorter "turn out" specification is made longer than the other needle to match up the needle shoulders to a flush condition. Hence, hitherto in order to accommodate these deviations by the engine customers a large number of different size needles had to be manufactured and inventoried, with a corresponding cost penalty.

In accordance with the two-piece needle valve feature of this invention, this "turn out" specification deviation problem is overcome by the provision of the two-part needle 320' since the same can be readily made to various predetermined overall lengths during manufacture, as needed, as by varying the extent of telescopic overlap of rabbit stud 325 in head bore 339, i.e., reduced penetration of the stud equals greater overall needle length and vice versa. This adjustment in overall length can be accomplished by providing a suitable precision assembly fixture which accurately controls the depth of penetration of stud 325 into bore 339.

Alternatively, varying thicknesses of spacer washer shims may be provided and selected. A selected one of such washer shims having the appropriate thickness dimension (parallel to its axis) is then necklaced onto stud 325. When the needle valve is assembled the selected shim washer is held tightly clamped between head face 343 and shank face 323. The O.D. of the shim washer is preferably the same as that of the maximum O.D. of shoulder 232' of the needle head so that the face of the spacer shim facing tip 104 becomes the abutment surface for the end coil of the needle valve spring 110. Alternatively, the spacer shim O.D. can be the same as that of the shank portion of part 100' so that the end coil of the spring continues to seat against head face 343. The use of selected thickness spacer shim washers in the foregoing manner obviates the need for a precision-type assembly fixture.

Second Embodiment of Variable Length Needle Valve

Figure 20:
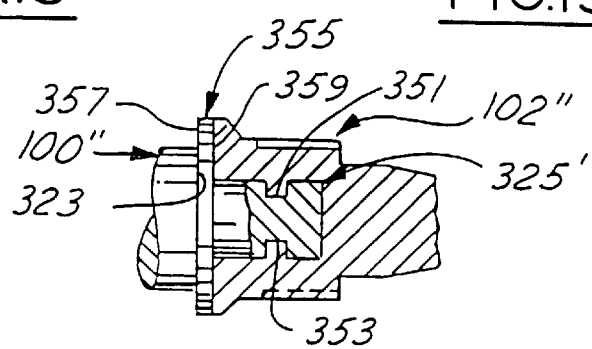
FIG. 20 is a fragmentary, part cross-sectional, part elevational view of a further modification of the two-piece needle valve of FIGS. 14–19.

An alternative method and construction for joining together the two parts of variable length needle 320' is illustrated in FIG. 20. In this second embodiment of a two-piece needle valve construction a modified shank part 100" is provided having a fully cylindrical rabbit stud 325' protruding from shank outer end shoulder face 323 coaxially of the shank. A pair of diametrically opposite chordal cross cuts are made in stud 325' to form opposed notches 351 and 353 approximately mid-length of stud 325'. Shank 100" is then used in the manner of a mold insert to thereby precisely position stud 325' into the mold cavity into which the molten zinc alloy is to be die cast to form the head 102' having the same exterior configuration as head 102'. The molten metal fills the notches 351 and 353 and when solidified provides both an anti-rotation lock and a locking key preventing relative axial motion between the shank and head. Again, the overall axial length of the two-part needle valve 100"–102" can be varied during manufacture by varying the depth of insertion of stud 325' into the mold cavity in a precision fixturing set up. Alternatively, a selected thickness spacer shim 355 may be provided having the same OD as shoulder 232', and which is first preassembled on stud 325' before being abutted to the margin of the die casting mold cavity. Washer 355 then can serve as an end lid seal to the mold cavity, thereby simplifying mold design.

Additionally, if desired, the inwardly facing spring seating face 357 of shim washer 355 may be formed with various types of non-planar surfaces such as a knurled surface, radially extending teeth, etc. This enhances the anti-rotational frictional abutment of the end coil of the needle spring 110 in assembly of the needle to the carburetor. The axially opposite face 359 of washer 355 may be likewise serrated, if desired, to enhance the frictional mechanical lock of the molten zinc against this face during the casting operation. Also, sufficient bond strength may result during casting for resisting relative rotation and pull off forces between the head and shank to obviate the need for the locking notches 351 and 353.

Again, selecting the appropriate thickness shim washer 355 enables the appropriate overall needle length to be achieved during the joinder of the shank to the head of the two-part needle. Both the shank part and the head part can then be made as standard size parts and yet provide an inventory of different length needle valves as may be required to meet the aforementioned engine customer deviations from nominal "turn out" specifications.

It will also be understood that head 102' alternatively can be made as a duplicate of the prior needle heads in materials such as brass or stainless steel and preferably on a Swiss-type precision automatic screw machine. With such a modification the blind bore/counterbore 339/341 would first be drilled and bored before lathe turning of the stock to the finished diametrical dimensions and configuration.

As another alternative, the die cast head part 102' could be die cast as a standard part, whereas the shank part 100' made to differing overall axial lengths to provide a selection of variable length needle assemblies. An additional advantage of making head part 102' as a standardized precision die casting is that manufacturing control of the precise dimensions and configurations of this relatively tiny part is accomplished in the die casting operation without requiring any machining, thereby eliminating inaccuracies and tolerance stack-ups that can occur during sequential or simultaneous machining operations.

The foregoing variable-length needle valve embodiments discussed in conjunction with FIGS. 14–20 and the above-described variations thereof thus provide an economical solution to the problems of maintaining a specified spacing on the needle shoulder from the carburetor body reference face, as well as flush relationship between the spring abutment flanges on side-by-side needles, and also precision location of the various control surfaces to thereby render the use of orientor clips 994 and 994' reliable and economical in a wider variety of carburetor/engine/appliance applications.

Third Embodiment of Variable Length Needle Valve

FIGS. 21–41 illustrate a third embodiment of a variable length needle valve that is presently preferred over the first and second embodiments of FIGS. 14–20, and that is also provided in accordance with the present invention. The third embodiment needle valve 420 preferably is a three-piece assembly of a tip/shank part 422, a head part 424 and a compression coil spring 426 (shown only in FIG. 32). As before, those portions of parts 422 and 424 corresponding to like configured portions of the one piece needle valve 320 of the aforesaid parent application, and/or referenced previously herein in conjunction with the two-piece needle valve embodiment 320' of FIGS. 14–19, are given like reference numerals and their description not repeated. Thus the tip/shank part 422 of needle assembly 420 has a main barrel portion 428 with the external threads 106 to engage complementary threads within the carburetor body to enable threaded securement of valve 420 therein and axial adjustment of the needle tip flow control surfaces 104 within a fuel flow passage of the carburetor body. Shank part 422 differs as to the configuration of its structure at its outer end closest to a head part 424 as best shown in FIGS. 22, 23, 31, 32 and 35–42. Thus the head-end portion of tip/shank part 422 is formed with a conical shoulder 430, tapering down from the cylindrical barrel portion 428 at acuted angle A (preferably 70°), to a junction with a cylindrical neck portion 432. Neck 432 extends a short distance axially to a radially extending cross arm portion 434, and a small diameter cylindrical spring keeper stem 436 protrudes axially therefrom (as best seen in FIGS. 22 and 23). Part 420 is preferably manufactured in a Swiss-type precision automatic screw machine as a body of revolution wherein cross arm portion 434 is first lathe-tuned to a cylindrical configuration and then flats 438 and 438' precision ground on opposite sides of portion 434 parallel with one another to form the cross arm configuration as seen in end elevation in FIG. 23; see also FIGS. 35 and 36.

Head part 424 of the three-piece needle assembly 420 is exteriorly configured to be essentially the same as head part 102' of the first embodiment two-piece needle 320' described previously, and likewise is preferably precision die cast of metallic material such as zinc or the like. However, the interior passages formed in the inner end of head part 424 are substantially different from those 102' and are configured to cooperate with the head-end portions 430, 432, 434 and 436 of the tip/shank part 420 to provide a telescopic releasable, interlocking interengagement between parts 422 and 424 in the manner of a spring-biased, lost-motion, quarter-turn bayonet lock. Thus, referring to FIGS. 26–34, it will be seen that head part 424 is provided with two main passageways; namely, an axially extending central passageway 440 and a radially extending cross-through passageway 460. Central passageway 440 opens at one end to the inner end face 343 of part 424 and at its other axially opposite end opens to a coaxial cylindrical blind bore 442. The radial cross sectional configuration of passage 440 is seen in the sectional view of FIG. 30, and is complementary to the exterior configuration of cross arm 434 in plan view (compare FIG. 23). Thus passageway 440 has two parallel flat side walls 444 and 446 spaced apart slightly greater than the distance of the spacing between cross arm side wall flats 438 and 440, and which are interrupted by diametrically opposite central curved sections 448 and 450 to accommodate the cylindrical neck portion 432 of the tip/shank part 422. The opposite end walls 449 and 451 of axial passageway 440 are concavely curved to match the convex curvature of the opposite end surfaces 437 and 439 of cross arm 438 and are spaced to provide a slight clearance therebetween; (FIGS. 23 and 30). As best seen in FIG. 32 the interior blind bore 442 provides a pocket to receive compression coil spring 426 with its inner end coils abutting the pocket end wall 452 in assembly. The side walls 444–450 of passageway 440 as they exit through flange end face 343 are chamfered to provide beveled lead-in faces 454 and 456 (FIG. 28; see also FIGS. 32, 35 and 38).

The other main passageway in head part 424, i.e., cross-through passageway 460, intersects central passageway 440 and hence is made up of diametrically opposite passage sections 462 and 464 that are best seen in FIGS. 28, 29 and 30. As best seen in the enlarged detail of FIG. 27, the exterior end of cross passage section 464, where it exits through the exterior flutes 240' of the spline section 238', is notched out at 466 to form the locking abutment shelf 468. The other half passage section 462 is likewise provided with a notched out section 469 to form a locking shelf abutment 470 diagonally opposite shelf 468 (FIGS. 24 and 30). The notched-out space above each shelf provides swinging clearance for cross arm 438 for its quarter turn rotation when fully inserted into end part 424, as set forth in more detail hereinafter. The axial dimension of each of the notches 466 and 469 is slightly greater than the axial dimension of cross arm 434, as will be best seen in FIGS. 39 and 40.

The procedure for assembling needle valve 420 is shown sequentially in FIGS. 35–42. FIGS. 35, 36 and 37 show the tip/shank part 422 aligned coaxially with head part 424 and with stem 436 partially inserted into the open end of axial passageway 440. It is to be understood that spring 426 has already been preassembled in head part 424 by inserting it end wise into spring bore 442 so as to be bottomed therein (spring 426 is omitted from FIGS. 35–42 for clarity). In its expanded free-state, the lower end coils of spring 426 preferably line up generally flush with head flange 232' and hence would be started on stem 436 when the same is positioned as shown in FIGS. 35–37.

Figure 38:
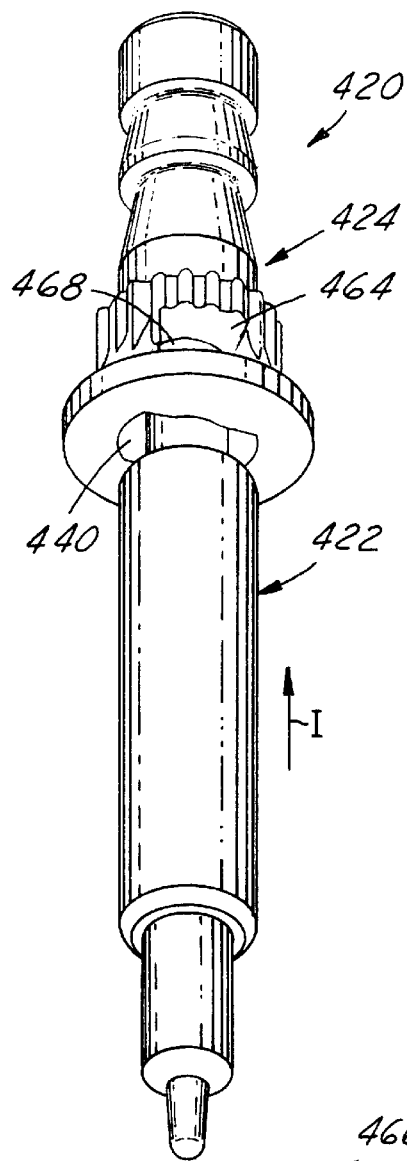
FIG. 38 is a perspective view looking from the tip end of the needle valve assembly showing the tip/shank part fully inserted into the head of the assembly and prior to relative rotation between the parts.
Figure 39:
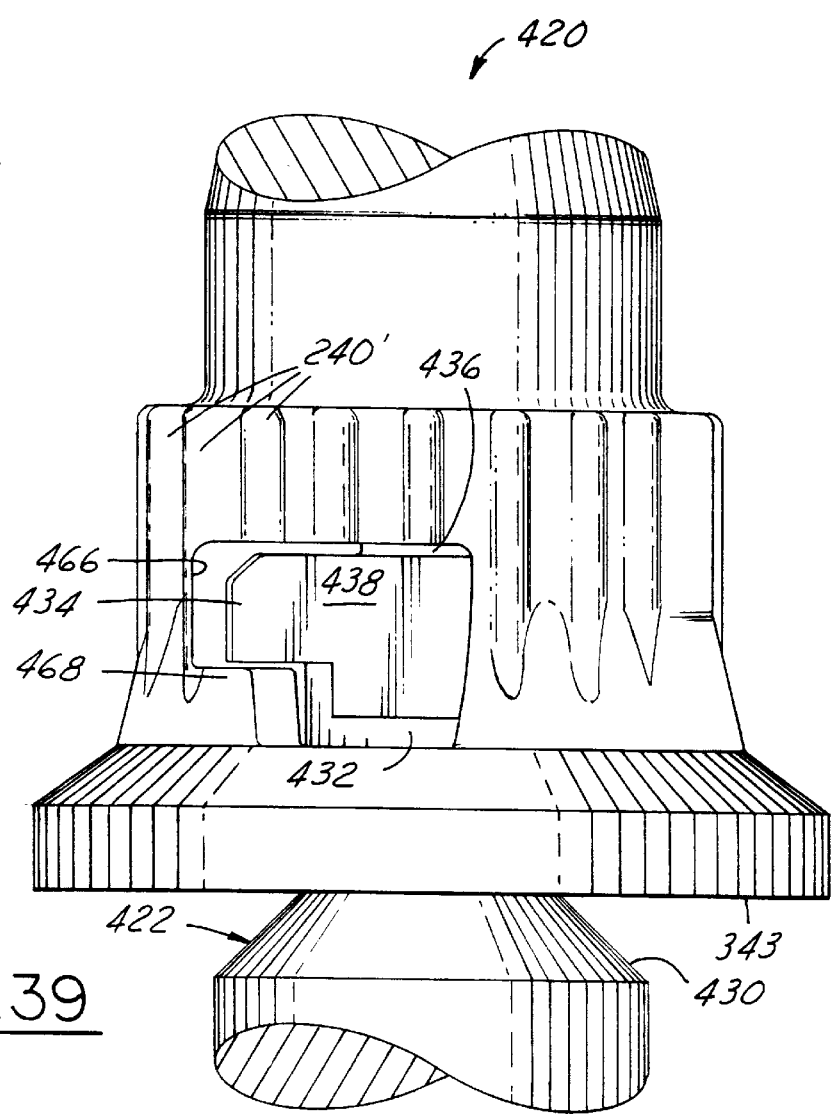
FIG. 39 is a fragmentary elevational view showing the tip/shank part fully inserted into the head part and corresponds to FIG. 38

Referring next to FIGS. 38 and 39, it will be seen, as indicated by arrow I in FIG. 38, that tip/shank part 422 has been inserted into head 424 to position it fully telescoped therein such that the upper surface of cross arm 438 abuts or is slightly spaced from the upper walls of radial cross passages 462 and 464. Spring 426 is now fully compressed between the upper surface of cross arm 438 and spring pocket end wall 452. Note that the major axis of cross arm 438 is still parallel to the major axis of axial passage 440 in this position. Note further that in this position the under surfaces of cross arm 438, as best seen in FIG. 39 are spaced slightly above the upper surfaces of abutment shoulders 468 and 469.

Figure 40:
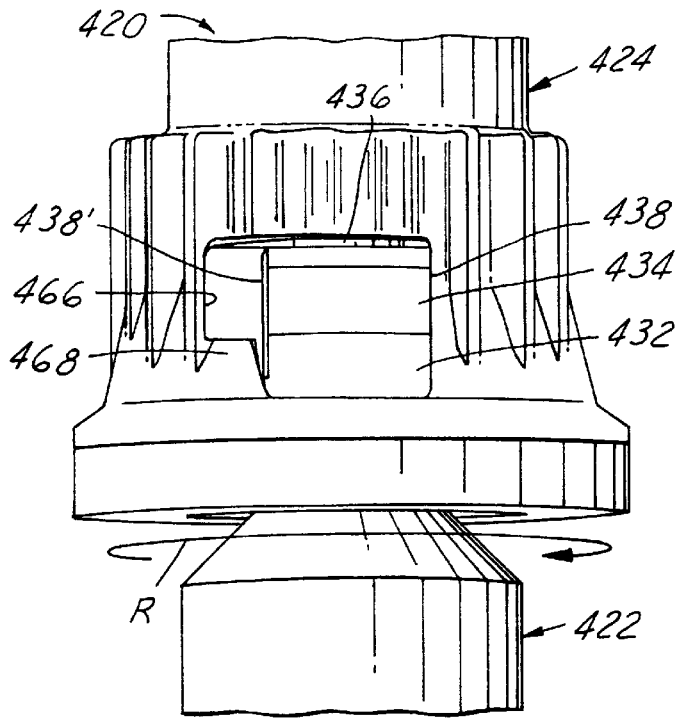
FIG. 40 is a fragmentary elevational view showing the tip/shank part rotated 90° from its position in FIG. 39 while the head part is held stationary in its position in FIG. 39.
Figure 42:
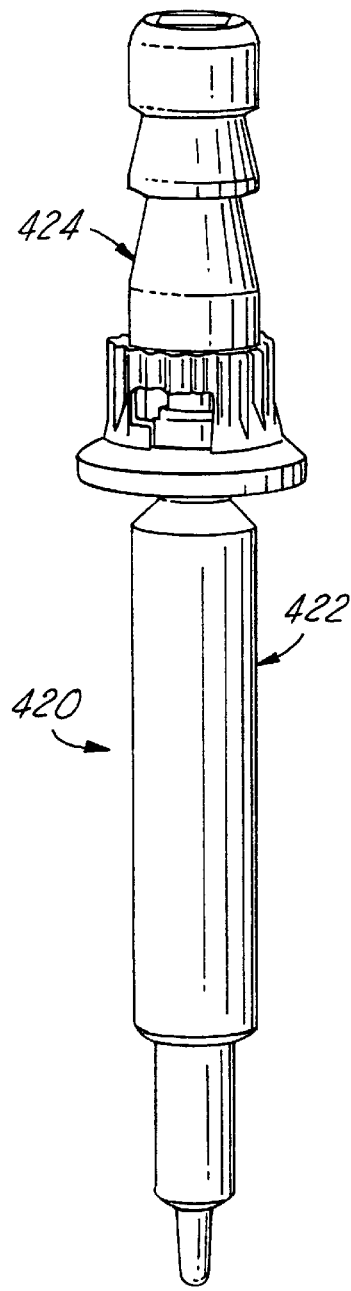
FIG. 42 is a perspective view of the needle assembly fully engaged and locked as in FIG. 41.
Figure 41:
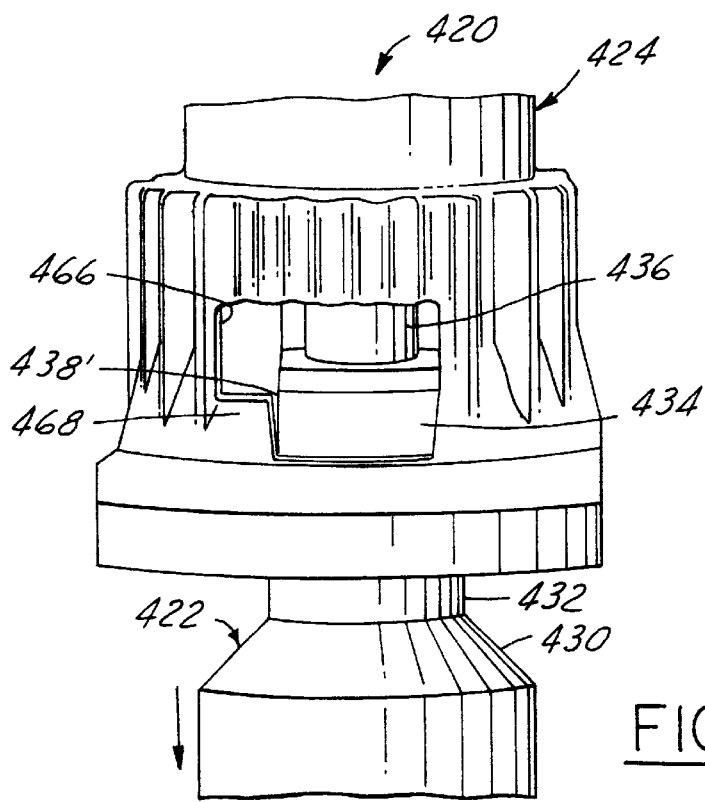
FIG. 41 is a fragmentary elevational view showing the cross arm of the upper end of the tip/shank part moved downwardly into its seated and locked position in the head part to thereby lock the head part of the needle valve assembly against rotation relative to the tip/shank part.

Referring next to FIG. 40 the next step in the assembly procedure is to rotate, as indicated by arrow R in FIG. 40, the tip/shank part 422 one quarter turn (90°) counterclockwise from the position shown in FIG. 39 to its position shown in FIG. 40. This swings cross arm 434 so that its major axis aligns parallel with the axis of cross passageway 460. Note that the cross arm flats 438 and 440 now are aligned to clear the side surfaces of the abutments 468 and 470. It is to be understood that the parts 422 and 424 are being gripped and pushed tightly together to maintain spring 426 fully compressed during this relative rotation. Once cross arm 434 is so aligned as shown in FIG. 40 and then the push-together grip force released, cross arm 434 is moved to its fully locked position of FIG. 41. The push-apart force exerted on parts 422 and 424 by the bias of spring 426 is sufficient to force parts 422 and 424 axially apart and to hold cross arm 434 seated on the bottom wall of the radial cross passages 462 and 464 as shown in FIG. 41. The two needle parts 422 and 424 are now locked up against both further axial separation as well as relative rotation, and are securely but releasably maintained in this condition by the force of spring 426 so that needle valve 420 will not come apart when handled, transported, stored and fixtured as a unitary assembly. The fully locked up assembly of shank 422 and head 424 to comprise the operative three-piece needle valve assembly 420 is shown in FIG. 42 (as well as in FIGS. 21 and 31–33).

It should be noted at this point that head part 424 can be moved against the bias of spring 426 axially from the full lock-up position shown in FIG. 41 towards shoulder 430 of shank part 422 a distance almost the full height or axial dimension of locking shoulder 468 without thereby unlocking head 424 from its anti-rotation engagement relative to shank 422. Hence in this sense there is a spring-biased lost motion coupling due to this freedom of axial motion permitted in the needle valve assembly 420. This is also true after needle valve assembly 420 has been threadably mounted to carburetor 74 in the manner of needle valve 76 and 78, as shown in FIGS. 1–4 as described previously, with the associated needle valve coil spring 110 sleeved on shank part 422 and compressed between the carburetor body and needle head flange 232'. Indeed, assembly spring 426 can be omitted, if desired, since spring 100 exerts more than adequate biasing force to hold the parts 422 and 424 securely coupled under all engine operating conditions.

Alternatively, if desired merely for needle assembly bonding purposes, a low cost rod of resilient low density foam can be substituted for assembly spring 426, or a piece of tape merely applied externally to temporarily hold needle parts 422 and 424 together for such handling prior to carburetor installation. It is also to be noted that this spring biased lost motion coupling after carburetor installation is also utilized as a feature of the invention to overcome the problem of uneven "turnout" of side-by-side needle valves described previously.

Note further that, due to the radial clearances between neck 432 and stem 436 of shank part 422 and their respective passageway receiving surfaces 448, 450 and spring bore 442, there also is a small amount of "radial play" permitted between head part 424 and shank part 422 in assembly. This is also a highly desirable feature to accommodate lateral misalignment of side-by-side needle valves 420 with associated paired limiter caps carried in the orientor peanut clip 994 that otherwise might impose undesirable bending movements on the installed needle valves.

From the foregoing description and accompanying drawings referenced therein, it will now be apparent to those skilled in the art that the third embodiment variable length needle valve assembly 420 also amply fulfills the aforementioned objects and provides a low cost alternative to existing one-piece needle valves, as well as obtaining the advantages of the first and second two-piece needle valve embodiment of FIGS. 14–19 in terms of lower manufacturing costs as well as improved definition in tolerances of the spline flutes 240'. In addition, the three shank and head parts 422 and 424 of the needle valve assembly 420 are easy to manually assemble without special fixturing (with or without assembly spring 426), and no press fit or adhesive is required for assembly of these parts. The needle head part 424, like head 102', can be standardized and made to fit most if not all customer needle valve applications, allowing the carburetor manufacturer to purchase parts 102' or 424 in high volumes that are relatively low in price.

The die casting of heads 102' and/or 422 renders the formation of the square engagement hole 108' in the outer end of the head a simple mold coring operation in the die casting mold. This square cross section hole thus will be both easier to locate for manufacturing processing and carburetor assembly and adjustment of the needle valve, and also more tamper proof for the end user.

The precision die casting of heads 102' or 424 enables a very fine definition to be achieved in the flutes 240' of the spline segment 238' due to the inherent nature of the die casting process. This feature provides easier alignment of such head flutes 240' with the plastic splines 204 in the limiter caps 300L and/or 300H (see FIGS. 5 and 6), thereby facilitating slip-on installation of the limiter caps.

The threaded tip/shank part 100' of needle embodiment 320' or the tip/shank part 422 of needle assembly 420 require shorter cycle times for their manufacture in the screw machines and they can be made from smaller diameter stock, as compared to the prior one-piece needle valves wherein both the tip/shank portion and the head portion needed to be machined as a one-piece member in the screw machine processing. This feature thus results in a further cost reduction in manufacture of the needle valve assemblies 320' and 420.

The releasably coupled needle valve assembly 420 is further advantageous in that the construction of the bayonet type interlocking system between the shank and head parts provides some degree of isolation of the needle head from the threaded needle tip, both axially and radially. As noted previously this feature thus prevents, or at least minimizes, needle tip movement of the installed needle valves in the carburetor and hence prevents or minimizes subsequent fuel flow changes otherwise resulting from such tip movement. Moreover, the aforementioned yieldable spring biasing "shock absorber" lost motion axial movement allowed between needle head and shank, on the order of 0.50 mm, enables more needle height off-set to be designed into the paired needle valve carburetor installations in such side-by-side needle valve applications. Hence the number of different length sizes of needle tip/shank parts required to be made and stocked in inventory to satisfy different offset requirements of various carburetors, as well as to satisfy the individual offset or turnout variations desired by various engine customers, can be accommodated with a substantially reduced part inventory and resultant cost savings while still insuring that both limiter caps are locked on during final installation on two-stage needles with two-stage caps, as explained previously.

In this regard it should be understood that for first stage installation of the peanut-clip-carried limiter caps, only one of the side-by-side needles has to be "hooked" by a limiter cap clip spring barb in order to hold the subassembly of paired limiter caps and the peanut clip on both of the needle valves. Hence the lost motion feature for accommodating non-flush needle valve heads comes into play only during second stage installation when it becomes critical that both limiter caps be "locked-on" their associated needle valve heads. The push-on force transmitted by the leading end of the limiter cap engaging the head flange shoulder 232 on the "longer" needle valve (greater "turn out") will cause that head to telescope on its shank inwardly towards the carburetor a distance sufficient to permit "lock-on" of the barb of the adjacent limiter cap on the adjacent companion needle valve.

It will also now be understood from the foregoing disclosure that the foregoing features and advantages of the dual two-stage limiter cap retainer clip 994', those of the improved two-stage limiter caps 300L and 300H of the aforesaid parent application and those of the improved two-stage needle valve assembly 420 can all be combined and synergistically utilized in a paired, side-by-side needle valve carburetor installation with clip-held caps needle-installed with suitable automated assembly fixturing in a mass production set-up. Then when manufacture and assembly of a single-needle carburetor installation is desired, the same automated assembly fixturing can still be used by providing the dummy needle 300LP of the set-up shown and described with reference to FIGS. 12 and 13 hereinabove to accommodate the same clip 994' and one of the two-stage limiter caps 300H'. Hence the cost savings as well as improved performance and reliability of the improved clip 994 and needle assembly 420 are likewise obtainable in such a single needle installation.

We claim:

1. A limiter cap holder clip of generally peanut shape in cross-section transverse to the axis of a limiter cap held by said holder clip, said holder clip having a pair of first and second end lobes constructed and arranged to respectively encircle most of the circumference of the respective cylindrical bodies of a pair of first and second limiter caps, said holder clip further having laterally spaced first and second nip portions connected to said end lobes and generally spanning the space therebetween and adapted for holding two limiter caps in a paired side-by-side subassembly with said holder clip for telescopic installation and rotational orientation on respective valve shank heads of a pair of carburetor-mounted needle valves, said second nip portion being split to form a parting gap therein to separate said second nip portion into first and second resiliently flexible spring legs respectively cantilevered from said first and second lobes, said legs each having a free end and being oriented such that said first leg free end faces said second leg free end and said parting gap is defined between said mutually facing leg free ends, and wherein said legs are interconnected by a living hinge in the form of an arcuate resiliently flexible web having its concave side facing said gap and being integrally joined at its longitudinally opposite ends to said legs so as to span said parting gap on the side of said legs remote from said first nip portion.

2. The holder clip of claim 1 wherein the width of said hinge web parallel to its axis of curvature is about the like dimension of said legs.

3. The holder clip of claim 2 wherein said hinge web is of generally uniform thickness about its radius of curvature.

4. The holder clip of claim 1 wherein said holder clip includes means adapted for resisting rotation of the caps on the needle shank when being held by said holder clip.

5. The holder clip of claim 1 wherein said first and second legs each have detent means formed on the sides thereof facing said first nip portion and located adjacent said leg free ends, said leg detent means being adapted to cooperate with detent means provided on the exterior of the cylindrical bodies of the first and second limiter caps for yieldably holding the caps against movement axially relative to said holder clip in an installed portion of the caps on the mounted needle valves.

6. The holder clip of claim 5 wherein the cap detent means on each of the caps comprises a circumferentially extending external groove, and wherein said detent means on each of said legs comprises a dimple protruding therefrom and being constructed and arranged for yieldable snap-in engagement with the groove of the associated cap.

7. A limiter cap holder clip for use with a carburetor having first and second jets and first and second side-by-side adjusting valve screws respectively operable in the carburetor for fuel flow control of the first and second jets, each screw having an adjusting head extending from the carburetor in exposed condition for jet adjustment, and for further use with first and second open-ended limiter caps each having a rotational limiting means and being respectively individually telescopically receivable open-end first on the screw adjusting heads in laterally closely spaced side-by-side paired relation, said holder clip being made of semi-resilient material resistant to damage by ozone and petroleum products and having first and second opposed end lobe portions respectively constructed and arranged for partially encircling and engaging the first and second caps, said holder clip further having first and second bight nip portions connected to said lobe portions and generally spanning the space between said end lobe portions, said holder clip lobe portions having cap interengaging means constructed and arranged such that said holder clip lobe portions are adapted to hold the caps in laterally spaced parallel axis relationship, to orient the caps for telescopic open-end first assembly onto the screw heads and to yieldably resist rotation of the caps about their axes relative to said holder clip; said second nip portion being split to form a parting gap therein to separate said second nip portion into first and second semi-resiliently flexible spring legs respectively cantilevered from said first and second lobe portions, said legs each having a free end and being oriented such that said first leg free end faces said second leg free end and said parting gap is defined between said mutually facing leg free ends, and wherein said legs are interconnected by a living hinge in the form of an arcuate resiliently flexible web having its concave side facing said gap and being integrally joined at its longitudinally opposite ends to said legs so as to span said parting gap on the side of said legs remote from said first nip portion.

8. The holder clip of claim 7 in further combination with said limiter caps, and wherein said lobe portions interengaging means comprises cooperative recess and projection means on mating engagement surfaces of said holder clip and lobe portions and the associated one of the caps, and said cap holder clip is constructed of semi-resilient material to permit yieldably flexing of at least one of said clip bight nip portions to accommodate interference rotary ride-over engagement of said recess means relative to said projection means and thereby yieldably permit individual adjustment rotation of said caps within the associated lobe portions.

9. The holder clip of claim 7 wherein the valve screws and caps are of two stage installation construction, and wherein said cap holder clip has a stop leg protruding from the side thereof facing the carburetor and dimensioned relative to the valve screws and carburetor body such that a free end of said stop leg remote from said holder clip is adapted to abut the carburetor body when the caps and said holder clip are arranged as a preoriented subassembly in and with said cap holder and are pushed onto said adjusting heads as such as subassembly so that said stop leg thereby prevents push-on movement of the subassembly past a predetermined first stage valve adjustment position wherein said caps are free to rotate on their associated valve screws.

10. The holder of claim 9 wherein said stop leg is integrally joined to said holder clip at said first bight nip portion.

11. The holder clip set forth in claim 10 wherein said clip is adapted for use with the limiter caps each having a laterally exteriorly protruding limiter arm serving as the rotational limiting means, said holder clip having limiter arm locking extension portions constructed and arranged to capture said limiter arm of each of the caps to lock the caps against rotation in said holder clip with the caps angularly oriented in a rich-rich preset position and with the caps fully telescopically inserted into said holder clip, and wherein said holder clip stop leg is dimensioned relative to the screw valves and carburetor body such that when said stop leg abuts the carburetor body the caps are axially positioned by said holder clip in the first stage position wherein the caps are locked by said holder clip against rotation therein and are locked to the valve screw against pull off but the valve screw is free to rotate relative to said caps, said holder clip being constructed such that the caps are axially slidable relative to said holder clip to permit them to be pushed further onto the valve screws while said holder clip is being held stationary by said clip stop leg to thereby reposition the caps into a second stage position so as to be again locked onto their valve screws against pull off but not rotatably drivingly engaged with their valve screws, said locking extension portions being constructed such that the limiter arms are unlocked from said locking extension portions by cap travel to the second stage position to thereby permit rotation of the cap bodies for rotating the associated valve screws within the range permitted by the cap limiter arms.

12. A limiter-cap-receiving needle valve assembly for adjusting fuel flow in a carburetor having a generally cylindrical rotatable elongate shank part with a flow controlling valve control surface at one end, an externally threaded portion on said shank part adjacent said one end thereof for threadably adjusting the axial position of the valve control surface when operably installed in the carburetor, a rotationally manipulatable head part operably coupled at one axial end thereof to a second end axially opposite said one end of said shank part for rotatably driving said shank and having a given maximum diameter, a limiter cap stop flange on said head part protruding radially outwardly of said head and shank parts and located axially on one axial end of said head part closest to said shank threaded portion, a radially enlarged externally fluted spline portion protruding radially outwardly from said head part and located axially between said flange and an axially opposite end of said head part, and a head first groove portion located axially between said head spline portion and a first head-shoulder portion located on said head adjacent said head opposite end, said head first groove portion having a first surface of revolution of reduced diameter relative to said head opposite end maximum diameter and disposed adjacent thereto to define a first head-shoulder junction therewith, said head groove portion also having a conically tapering portion extending axially from said reduced diameter first surface of revolution toward said spline portion and increasing in diameter from minor to major diameter portions thereof in the direction toward said spline portion, and wherein said head and shank are separately made one-piece parts.

13. The needle valve assembly of claim 12 wherein said cap stop flange has a generally conical surface tapering divergently away from said head opposite end between minor or major diameter portions thereof respectively diametrically sized less than and greater than the major diameter portion of said head spline.

14. The needle valve assembly of claim 12 provided for use with a two-stage limiter cap and wherein said head part also has a secondary head-shoulder portion disposed between said reduced diameter first surface of revolution and said conically tapering portion of said groove portion, said secondary head portion having a generally conical surface divergent away from said opposite end of said head part, said secondary head-shoulder portion terminating at a second surface of revolution on said shank part of reduced diameter relative to the maximum diameter of said secondary head-shoulder portion to define therewith a secondary head-shoulder junction, said second surface of revolution being contiguous with the minor diameter portion of said conically tapering portion of said shank groove portion.

15. The needle valve assembly of claim 14 wherein said shank part is a one-piece lathe-turned body of revolution, and said head part is a one-piece mold cast part.

16. The valve member of claim 15 wherein said shank part has a stem protruding beyond said second end thereof and telescoped into a receiving cavity formed in said one end of said head part.

17. The valve member of claim 16 wherein said shank part stem has a press fit in said head part receiving cavity to permanently join said head and shank parts.

18. The valve member of claim 16 wherein said head part is a casting and said shank part stem is in-situ cast embedded in said head part to form said head part receiving cavity in surrounding contiguous relation with said stem to thereby permanently join head and shank parts.

19. The valve member of claim 16 wherein said shank part stem has a radially extending cross arm, and said head part receiving cavity is constructed and arranged to cooperate with said stem and cross arm thereof to form a telescopic, quarter-turn and retrograde relative motion bayonet coupling for releasably operably coupling together said shank and head parts.

20. The valve member of claim 19 wherein said part receiving cavity contains compressible elastic means for biasing said shank stem cross arm toward coupling lock up in said head part receiving cavity.

21. The valve member of claim 19 wherein said head part cavity construction is adapted to be biased into coupling lock-up with said shank part stem cross arm by a needle valve compression coil spring sleeved over said shank part when installed in a carburetor body and abutted at its ends between the carburetor body and said head part flange.

22. The valve member of claim 21 wherein said shank part stem and cross arm have a slight radial clearance fit in said head part cavity construction in the coupling lock-up condition thereof to thereby permit slight relative lateral motion between said head and shank parts.

23. The needle valve assembly of claim 12 wherein said shank part is a one-piece lathe-turned body of revolution, and said head part is a one-piece mold cast part.

24. The needle valve assembly of claim 23 wherein said shank part has a stem protruding beyond said second end thereof and telescoped into a receiving cavity formed in said one end of said head part.

25. The needle valve assembly of claim 24 wherein said shank part stem has a press fit in said head part receiving cavity to permanently join said head and shank parts.

26. The needle valve assembly of claim 24 wherein said head part is a casting and said shank part stem is in-situ cast embedded in said head part to form said head part receiving cavity in surrounding contiguous relation with said stem to thereby permanently join head and shank parts.

27. The needle valve assembly of claim 24 wherein said shank part stem has a radially extending cross arm, and said head part receiving cavity is constructed and arranged to cooperate with said stem and cross arm thereof to form a telescopic, quarter-turn and retrograde relative motion bayonet coupling for releasably operably coupling together said shank and head parts.

28. The needle valve assembly of claim 27 wherein said part receiving cavity contains compressible elastic means for biasing said shank stem cross arm toward coupling lock up in said head part receiving cavity.

29. The needle valve assembly of claim 27 wherein said head part cavity construction is adapted to be biased into coupling lock-up with said shank part stem cross arm by a needle valve compression coil spring sleeved over said shank part when installed in a carburetor body and abutted at its ends between the carburetor body and said head part flange.

30. The needle valve assembly of claim 29 wherein said shank part stem and cross arm have a slight radial clearance fit in said head part cavity construction in the coupling lock-up condition thereof to thereby permit slight relative lateral motion between said head and shank parts.

31. A limiter-cap-receiving needle valve assembly for adjusting fuel flow in a carburetor having a generally cylindrical rotatable elongate shank part with a flow controlling valve control surface at one end, an externally threaded portion on said shank part adjacent said one end thereof for threadably adjusting the axial position of the valve control surface when operably installed in the carburetor, a rotationally manipulated head part operably coupled at one axial end thereof to a shank part second end axially opposite said one end of said shank part for rotatably driving said shank part, a limiter cap stop flange on said head part protruding radially outwardly of said head and shank parts and located axially on one axial end of said head part closest to said shank part threaded portion, a radially enlarged externally fluted spline portion protruding radially outwardly from said head part and located axially between said flange and an axially opposite end of said head part, said head part having groove means and shoulder means located adjacent said groove means for yieldably retaining a limiter cap axially on said head part for free rotation thereon and axially spaced from said spline portion, and wherein said head and shank parts are separately made one-piece parts.

32. The needle valve assembly of claim 31 wherein said shank part is a one-piece lathe-turned body of revolution, and said head part is a one-piece mold cast part.

33. The needle valve assembly of claim 32 wherein said shank part has a stem protruding beyond said second end thereof and telescoped into a receiving cavity formed in said one end of said head part.

34. The needle valve assembly of claim 33 wherein said shank part stem has a press fit in said head part receiving cavity to permanently form said head and shank parts.

35. The needle valve assembly of claim 33 wherein said head part is a casting and said shank part stem is in-situ cast embedded in said head part to form said head part receiving cavity in surrounding contiguous relation with said stem to thereby permanently form head and shank parts.

36. The needle valve assembly of claim 33 wherein said shank part stem has a radially extending cross arm, and said head part receiving cavity is constructed and arranged to cooperate with said stem and cross arm thereof to form a telescopic, quarter-turn and retrograde relative motion bayonet coupling for releasably operably coupling together said shank and head parts.

37. The needle valve assembly of claim 36 wherein said part receiving cavity contains compressible elastic means for biasing said shank stem toward coupling lock-up in said head part receiving cavity.

38. The needle valve assembly of claim 36 wherein said head part cavity construction is adapted to be biased into coupling lock-up with said shank part stem cross arm by a valve member compression coil spring sleeved over said shank part when installed in a carburetor body and abutted at its ends between the carburetor body and said head part flange.

39. The needle valve assembly of claim 38 wherein said shank part stem and cross arm have a slight radial clearance fit in said head part cavity construction in the coupling lock-up condition thereof to thereby permit slight relative lateral motion between said head and shank parts.

40. The needle valve assembly of claim 38 in combination with a second needle valve assembly substantially identical to said first mentioned needle valve assembly and both installed side-by-side in a carburetor, and in further combination with a pair of first and second limiter caps and a limiter cap holder clip of generally peanut shape in cross-section transverse to the axis of said pair of limiter caps held side-by-side by said holder clip, said holder clip having a pair of first and second end lobes constructed and arranged to respectively encircle most of the circumference of the respective cylindrical bodies said first and second limiter caps, said holder clip further having laterally spaced first and second nip portions connected to said end lobes and generally spanning the space therebetween and adapted for holding said limiter caps in a paired side-by-side subassembly with said holder clip for telescopic installation and rotational orientation on respective valve shank heads of said first and second carburetor-mounted needle valve assemblies, said second nip portion being split to form a parting gap therein to separate said second nip portion into first and second resiliently flexible spring legs respectively cantilevered from said first and second lobes, said legs each having a free end and being oriented such that said first leg free end faces said second leg free end and said parting gap is defined between said mutually facing leg free ends, and wherein said legs are interconnected by a living hinge in the form of an arcuate resiliently flexible web having its concave side facing said gap and being integrally joined at its longitudinally opposite ends to said legs so as to span said parting gap on the side of said legs remote from said first nip portion.

41. The combination of claim 40 wherein said holder clip first and second legs each have detent means formed on the sides thereof facing said first nip portion and located adjacent said leg free ends, said leg detent means being operable to cooperate with cap detent means provided on the exterior of the cylindrical bodies of said first and second limiter caps for yieldably holding the caps against movement axially relative to said holder clip in an installed portion of the caps on the mounted needle valves.

42. The combination of claim 40 wherein said cap holder clip has a stop leg protruding from the side thereof facing the carburetor body and dimensioned relative to the said needle valve assemblies and carburetor body such that a free end of said stop leg remote from said holder clip is adapted to abut the carburetor body when said caps and said holder clip are arranged as a preoriented subassembly in and with said cap holder clip and are pushed onto said needle valve adjusting heads as such a subassembly so that said stop leg thereby prevents push-on movement of the subassembly past a predetermined first stage valve adjustment position wherein said caps are free to rotate on their associated needle valve assemblies.

43. The combination holder of claim 42 wherein said stop leg is integrally joined to said holder clip at said first bight nip portion.

44. The combination set forth in claim 43 wherein said limiter caps each have a laterally exteriorly protruding limiter arm serving as the rotational limiting means, said holder clip having limiter arm locking extension portions constructed and arranged to capture said limiter arm of each of said caps to lock said caps against rotation in said holder clip with said caps angularly oriented in a rich-rich preset position and with said caps fully telescopically inserted into said holder clip, and wherein said holder clip stop leg is dimensioned relative to said needle valve assemblies and carburetor body such that when said stop leg abuts the carburetor body said caps are axially positioned by said holder clip in the first stage position wherein said caps are locked by said holder clip against rotation therein and at least one of said caps is locked to the associated needle valve assembly against pull off but said needle valve assemblies are free to rotate relative to said caps, said holder clip being constructed such that said caps are axially slidable relative to said holder clip to permit them to be pushed further onto said needle valve assemblies while said holder clip is being held stationary by said clip stop leg to thereby reposition said caps into a second stage position so that both of said caps are locked onto their associated needle valve assemblies against pull off but not rotatably drivingly engaged therewith, said locking extension portions being constructed such that said limiter arms are unlocked from said locking extension portions by cap travel to the second stage position to thereby permit rotation of said cap bodies for rotating the associated needle valve assemblies within the range permitted by said cap limiter arms.

45. The combination set forth in claim 42 wherein said second needle valve assembly and said second limiter cap are omitted and are both replaced by a dummy stabilizing pin mounted in the carburetor in the location left vacant for said second needle valve assembly, said pin having a head occupying the position in said holder clip left vacant by said second cap and being operable as an angular locator, additional support and as an anti-rotation stop for said holder clip as installed with said first cap or said first needle valve assembly.

* * * * *

UNITED STATES PATENT AND TRADEMARK OFFICE
CERTIFICATE OF CORRECTION

PATENT NO. : 5,984,281
DATED : November 16, 1999
INVENTOR(S) : David D. Hacker, Eric L. King, George M. Pattullo It is certified that error appears in the above-indentified patent and that said Letters Patent is hereby corrected as shown below:

Col 23, Line 22, change "valve member" to -- needle valve assembly --.
Col 23, Line 26, change "valve member" to -- needle valve assembly --.
Col 23, Line 29, change "valve member" to -- needle valve assembly --.
Col 23, Line 34, change "valve member" to -- needle valve assembly --.
Col 23, Line 41, change "valve member" to -- needle valve assembly --.
Col 23, Line 45, change "valve member" to -- needle valve assembly --.
Col 23, Line 51, change "valve member" to -- needle valve assembly --.
Col 25, Line 29, delete "the" (second occurrence).
Col 25, Line 30, after "bodies" insert -- of --.

Signed and Sealed this

Second Day of January, 2001

Attest:

*Attesting Officer*

Q. TODD DICKINSON
*Commissioner of Patents and Trademarks*